(12) United States Patent
Ratnagiri et al.

(10) Patent No.: US 8,741,202 B2
(45) Date of Patent: Jun. 3, 2014

(54) OBTAINING MELT VISCOSITY STABILITY OF POLYOXYMETHYLENE COMPOSITIONS

(75) Inventors: Ramabhadra Ratnagiri, Wilmington, DE (US); Henry Keith Chenault, Hockessin, DE (US)

(73) Assignee: E I du Pont de Nemours and Company, Wilmington, DE (US)

(*) Notice: Subject to any disclaimer, the term of this patent is extended or adjusted under 35 U.S.C. 154(b) by 0 days.

(21) Appl. No.: 13/703,066

(22) PCT Filed: Jun. 27, 2011

(86) PCT No.: PCT/US2011/041972
§ 371 (c)(1),
(2), (4) Date: Feb. 18, 2013

(87) PCT Pub. No.: WO2011/163658
PCT Pub. Date: Dec. 29, 2011

(65) Prior Publication Data
US 2013/0175724 A1    Jul. 11, 2013

Related U.S. Application Data

(60) Provisional application No. 61/358,871, filed on Jun. 25, 2010, provisional application No. 61/358,869, filed on Jun. 25, 2010, provisional application No. 61/358,867, filed on Jun. 25, 2010.

(51) Int. Cl.
*B29C 47/00* (2006.01)
(52) U.S. Cl.
USPC .................................................. 264/328.1

(58) Field of Classification Search
CPC ......... C08L 71/02; C08L 59/02; C08L 59/04; B29C 47/0004; B29C 47/0009; C08G 2650/30
USPC .................................................. 264/328.1
See application file for complete search history.

(56) References Cited

U.S. PATENT DOCUMENTS

| 3,998,791 | A | 12/1976 | Radici et al. |
| 5,011,890 | A | 4/1991 | Novak |
| 5,143,982 | A * | 9/1992 | Niino ............................ 525/400 |
| 5,773,527 | A | 6/1998 | Tomalia et al. |
| 5,830,986 | A | 11/1998 | Merrill et al. |
| 6,140,420 | A | 10/2000 | Sehanobish et al. |
| 2002/0161113 | A1 | 10/2002 | Dvornic et al. |
| 2005/0165177 | A1 | 7/2005 | Wagner et al. |
| 2005/0182200 | A1 | 8/2005 | Kawaguchi et al. |
| 2008/0045668 | A1 | 2/2008 | Eibeck et al. |
| 2010/0004409 | A1 | 1/2010 | Schwittay et al. |

FOREIGN PATENT DOCUMENTS

EP    1 508 592    2/2005

* cited by examiner

*Primary Examiner* — Jill Heitbrink
(74) *Attorney, Agent, or Firm* — Loretta Smith; Otha Weaver

(57) ABSTRACT

Processes for improving melt flow properties of molten compositions with polyoxymethylene polymers and polymer/polyol additives having a certain core-link-arm structure, which include: obtaining melt viscosity stability while improving notched Izod, decreasing relative apparent capillary melt viscosity, and increasing elongation at break relative to molten compositions of polyoxymethylene polymers without the polymer/polyol additives.

20 Claims, 12 Drawing Sheets

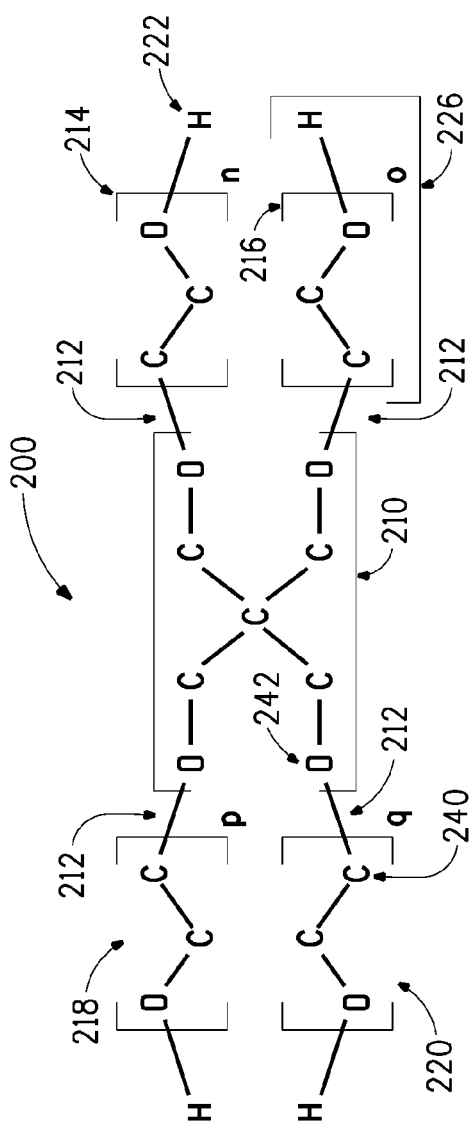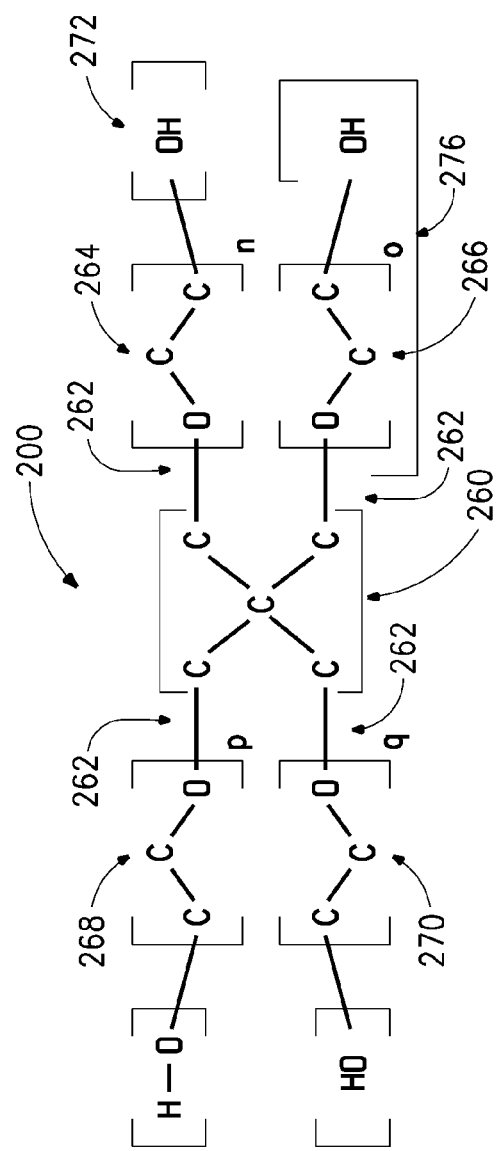
FIG. 2A
FIG. 2B

OBTAINING MELT VISCOSITY STABILITY OF POLYOXYMETHYLENE COMPOSITIONS

CROSS-REFERENCE TO RELATED APPLICATIONS

This application claims priority to U.S. Provisional Application Nos. 61/358,861, 61/358,862, and 61/358,866, filed 25 Jun. 2010, and through the International Application Nos. PCT/US11/41963 and PCT/US11/41972, filed 27 Jun. 2011, and currently pending, all of which are hereby incorporated by reference herein in their entirety.

FIELD

Described generally herein are free-flowing compositions containing polyoxymethylene polymers and branched polymers, branched copolymers, block copolymers and/or polyols. These compositions exhibit stabilized melt viscosity concurrent with an increased notched Izod impact strength and/or decreased relative apparent capillary melt viscosity, and/or increased flow length and/or improved elongation at break.

Overview

Effort is frequently given to methods of improving polyoxymethylene [POM] compositions with the aim of reducing production cost and simplifying processing as well as with the aim of making resultant articles have improved physical properties. In particular, such efforts include adding one or more new ingredients to POM compositions to enhance the tensile strength, shear resistance, impact resistance, thermal stability, solvent resistance, versatility in coloring, etc. of the resultant article. Additives known to improve melt flow of polyoxymethylene compositions include silicone oils, amines, phthalates, epoxy compounds, fatty acid esters, and sulfonates; however, these additives have recognized limitations.

Especially important performance improvements include improving or maintaining melt handling. Improving melt handling is achieved by reducing the melt viscosity of the POM composition as a function of temperature and shear. This promotes easier molding of the composition into complex article shapes, such as those with narrow portions. Reducing melt viscosity is related to improving melt flow or flowability.

Maintaining melt handling over an extended period of time is achieved by maintaining melt viscosity stability. This promotes the use of a large molten pool of a POM composition under the same processing conditions, which in turn promotes ease of processing the POM composition into articles.

U.S. Pat. App. Pub. No. 2008/0045668 discloses certain thermoplastic polyoxymethylene molding compositions as having flowability characterized as good. However, this reference does not address at all the stabilization of melt flow, i.e., improved processability of POM compositions.

Improvement in the performance of a physical property of a POM composition is preferably carried out while simultaneously improving, or at least not deteriorating significantly, the performance of other physical properties. Even though it is well known that adding low viscosity linear polymers to compositions comprising POM polymer may render the compositions usefully less viscous at various temperatures and shear rates, adding such low viscosity linear polymers can have unfavorable effects on tensile strength and/or impact resistance. Thus, such low viscosity linear polymers do not meet the combined need of improving processability of POM compositions while maintaining or improving tensile strength.

There is a need, during molding, to stabilize melt viscosity, that is, maintain initial POM molecular weight, and to improve flowability of POM compositions, especially in terms of apparent capillary melt viscosity and flow length, while simultaneously maintaining or improving properties such as notched Izod impact strength and elongation at break, of articles made with POM compositions.

The technical solution provided herein has been to add to polyoxymethylene polymers an amount up to 10 weight percent of polymers and/or polyols having certain core-link-arm structure, termed core-link-arm polymers. These core-link-arm polymers improve the melt characteristics of POM compositions. Adding these core-link-arm polymers to POM compositions to achieve the surprising, recited melt characteristics has not been known heretofore.

BRIEF DESCRIPTION OF THE DRAWINGS

FIG. 2 shows different perceptions of how to identify the core, link, and arm structures of core-link-arm polymer 200.

DETAILED DESCRIPTION

Definitions

Figure 1A:
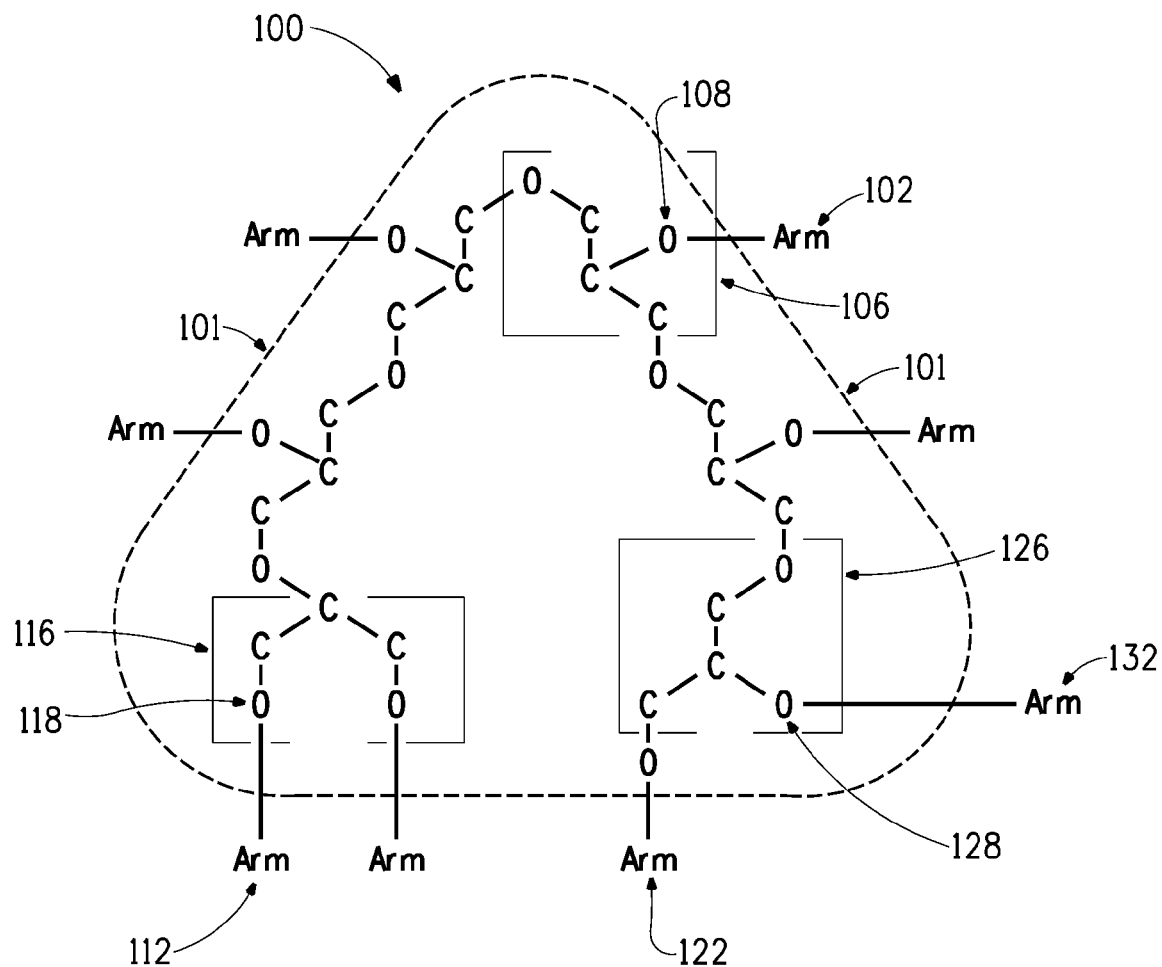
FIG. 1 illustrates some of the variability in identifying the core-link-arm structure, for oligo-glycerol based cores, especially, as illustrated here, for an 8-arm polymer.

The following definitions are to be used to interpret the meaning of the terms discussed in the description and recited in the claims.

As used herein, the article "a" indicates one as well as more than one and does not necessarily limit its referent noun to the singular.

As used herein, the terms "about" and "at or about" mean that the amount or value in question may be the value designated or some other value approximately or about the same. The term is intended to convey that similar values promote equivalent results or effects recited in the claims.

As used herein, the terms "comprises," "comprising," "includes," "including," "has," "having" or any other variation of these, refer to a non-exclusive inclusion. For example, a process, method, article, or apparatus that comprises a list of elements is not limited to only the listed elements but may include other elements not expressly listed or inherent. Further, unless expressly stated to the contrary, "or" refers to an inclusive, not an exclusive, or. For example, a condition A or B is satisfied by any one of the following: A is true (or present) and B is false (or not present), A is false (or not present) and B is true (or present), and both A and B are true (or present). As used herein, the terms "comprises," "comprising," "includes," "including," "has," "having", "consisting essentially of", and "consisting of" or any other variation of these, may refer either to a non-exclusive inclusion or to an exclusive inclusion. When these terms refer to a non-exclusive inclusion, a process, method, article, or apparatus that comprises a list of elements is not limited to the listed elements but may include other elements not expressly listed or which may be inherent. Further, unless expressly stated to the contrary, "or" refers to an inclusive, not an exclusive, or. For example, a condition A or B is satisfied by any one of the following: A is true (or present) and B is false (or not present), A is false (or not present) and B is true (or present), and both A and B are true (or present).

When these terms refer to a more exclusive inclusion, these terms limit the scope of a claim to those recited materials or steps that materially affect the novel elements of the recited invention.

When these terms refer to a wholly exclusive inclusion, these terms exclude any element, step or component not expressly recited in the claim.

As used herein, the term "article" refers to an unfinished or finished item, thing, object, or an element or feature of an unfinished or finished item, thing or object. As used herein, when an article is unfinished, the term "article" may refer to any item, thing, object, element, device, etc. that will be included in a finished article and/or will undergo further processing in order to become a finished article. As used herein, when an article is finished, the term "article" refers to an item, thing, object, element, device, etc. that has undergone processing to completion to thereby be suitable for a particular use/purpose.

An article may comprise one or more element(s) or subassembly(ies) that either are partially finished and awaiting further processing or assembly with other elements/subassemblies that together will comprise a finished article. In addition, as used herein, the term "article" may refer to a system or configuration of articles.

As used herein, terms that describe molecules or polymers follow the terminology in the *IUPAC Compendium of Chemical Terminology* version 2.15 (International Union of Pure and Applied Chemistry) of Sep. 7, 2009.

As used herein, the term "additive" refers to additional components added to the polyoxymethylene compositions described herein, which are different from the at least one polymer and/or polyol and having a core-link-arm structure recited in the claims.

As used herein, the term "weight average molecular weight" is abbreviated to $M_w$ or Mw.

As used herein, the term "number average molecular weight" is abbreviated to $M_n$ or Mn.

As used herein, the term "flowability" as applied to polymers, refers to the capability of a liquid or loose particulate solid to move by flow. Measuring flowability is done by measuring the following properties, among others: melt flow index, flow length, snake flow, and apparent capillary melt viscosity.

As used herein, the terms "polymer melt mass flow rate", "melt flow rate" or "melt flow index", abbreviated as "MFR" or as "MFI", refer to a measure of the ease of flow of a thermoplastic polymer melt, which includes a polymer composition melt. It is defined as the mass of polymer, in grams, flowing in ten minutes through a capillary of a specific diameter and length by a pressure applied via prescribed alternative gravimetric weights at alternative prescribed temperatures. The method is described in the standard ASTM D1238-04c. The polymer melt mass flow rate is reported in units of grams per 10 minutes, and carried out at condition 190° C./2.16 kg, unless otherwise specified.

Melt flow rate is an indirect measure of molecular weight, with high melt flow rate corresponding to low molecular weight. At the same time, melt flow rate is a measure of the ability of the melted material to flow under pressure. Melt flow rate is inversely proportional to viscosity of the melt at the conditions of the test, though it should be borne in mind that the viscosity for any such material depends on the applied force. Ratios of two melt flow rate values for one material at different gravimetric weights are often used as a measure of the breadth of the molecular weight distribution.

As used herein, the term "flow length" refers to the distance a molten composition passes within a specific mold and determined under test conditions identified herein as Flow Length Test Conditions.

As used herein, the term "Flow Length Test Conditions" refers to introducing molten polymer into a mold having an entrance and a mold cavity. The mold cavity has a serpentine volume, and a distal vent. The serpentine volume is flat, designed to produce a shape 2.5 mm high, 12 mm wide, and up to 112 cm long and has at most 4 bends of inner radius of 20 mm and outer radius of 32 mm.

The mold is maintained at 90° C. and the pool of polymer melt to be injected into the mold is maintained at 220° C. The polymer melt is injected through the entrance into the serpentine volume at a constant screw velocity of 10 mm/s. The polymer melt advances through the serpentine mold at a constant velocity. However, the pressure needed to maintain the constant velocity increases as the melt solidifies. When the pressure needed to maintain this constant velocity reaches 90 MPa, the Flow Length Test is stopped. The melt is frozen in the serpentine volume, ejected from the mold, and its length measured and recorded as the flow length.

In effect, an increase in flow length of a composition indicates improvement in its flowability.

As used herein, the term "apparent capillary melt viscosity" refers to experimental values obtained using the methods of ASTM D3835-08 at the indicated shear values and temperature.

As used herein, "melt viscosity stability" refers to S of paragraph X1.4 of ASTM D3835-08 measured at 220° C. and 100 $s^{-1}$ shear rate obtained by least squares fitting on semi logarithmic scale of viscosity in Pascals [Pa's] and time at temperature in minutes. Melt viscosity stability is a measurement of the rate of change over time of resistance to flow under shear of a molten polyoxymethylene composition under a described set of conditions, e.g., temperature and shear rate. In effect, maintaining melt viscosity stability of a composition ensures that any improvement in the flowability of the composition is not the result of polymeric degradation of the composition.

As used herein, the terms "Izod values", "notched Izod", "Izod strength", "Izod pendulum impact resistance", "notched Izod impact strength" and the like refer to results measured according to ASTM D 256-06A by method A.

As used herein, tensile properties including "elongation at break", "elongation to break", "tensile modulus", and "tensile strength" are determined by ASTM methods D638-08. Test conditions include using a certain specimen at a speed of testing. The test conditions herein have relied on "Type I specimens" as defined by ASTM methods D638-08 and a speed of testing of 50 mm (2 inches) per minute at room temperature.

As used herein, the term "polymer" refers to a macromolecule or a collection of macromolecules differing only in the number of repeating units, including an oligomer, homopolymer, or copolymer.

As used herein, the term "carbonate carbon" refers to the carbon atom in the following structure: (OC(=O)O), As used herein, the term "repeating unit" refers to the simplest structural entity of a polymer chain. It is that which, by its repetition, makes up the essential structure of a polymer molecule. There can be more than one type of repeating unit in a polymer molecule. Repeating units comprise constitutional repeating units and structural repeating units.

As used herein, the term "core unit" or "unit of the core" refers to a chemical structure that occurs at least once in the core, and need not necessarily refer to a repeating unit.

As used herein, the term "link unit" or "unit of the link" refers to a chemical structure that occurs at least once in the link, and need not necessarily refer to a repeating unit.

As used herein, the terms "polyoxymethylene", abbreviated as POM, "polyoxymethylene polymer" and "polyacetal polymer" refer to one or more homopolymers, copolymers, and mixtures of these, having a repeating unit of $.CH_2O.$. The terminal groups of these polymers are derived by initiating, terminating, or chain-transferring groups, such as water or alcohols, or by chemical reaction, such as that resulting in ester or ether groups, including acetate, acetyl, methyl and methoxy groups.

As used herein, the term "radical" (often referred to as free radicals) refers to atoms, molecules, or ions with unpaired electrons in an open shell configuration.

As used herein, the term "core-link-arm structure" refers to the structure of a polymer—either a block copolymer or branched macromolecule in which two or more linear polymer monoradicals, termed arms are linked to a core, which is a molecular or macromolecular multiradical of two or more radicals. A polymer having a core-link-arm structure is a core-link-arm polymer.

As used herein, the term "core-link-arm polymers" does not include dendrimeric polymers, dendritic polymers, dendrimers, hyperbranched polymers or linear homopolymers, such as polyethylene glycols [PEGs].

As used herein, the term "linked" refers to the act of an arm being connected to the core by:
(1) a chemical bond combining with one radical group of the core, or
(2) a chemical bond formed to one radical group of a diradical, while the other radical group of the diradical is connected to the core. At least one of the arms or the core may be oligomeric or polymeric. The core may be a single species, an oligomer, or a polymer.

As used herein, the term "link" refers to either a bond formed by combining a radical of the core with an arm monoradical, or to a diradical group that forms one bond to a radical of the core and one bond with an arm monoradical. In no case does an arm monoradical connect to a repeating unit of that arm.

As used herein, the term "comb polymers" refers to core-link-arm polymers composed of macromolecules having a linear main chain from which a large and typically variable number of linear polymeric side chains emanate, thereby resembling the shape of a comb. A comb polymer in which the position of the branches is known is an exact comb polymer. A comb polymer may be regarded as a graft copolymer with a high density of side chains. When branch points are separated by a few atoms, for example four, three, two, or one atoms, the comb polymer may be termed a brush polymer.

As used herein, the term "star polymer" refers to a core-link-arm polymer having a central branch point or core from which three or more essentially linear, polymeric arms emanate. The central branch point or core may be a single atom or a chemical group having a molecular weight of about 24 to about 1,000. The core may include repeating core units. The core of a star polymer may, itself, be oligomeric or polymeric in structure. The essentially linear, polymeric arms may have branches containing from 1 to about 20 heavy (non-hydrogen) atoms, but these branches are not formed or elongated by the same polymerization process as that forming the polymeric arms emanating from the central branch point or core. In this way, star polymers differ from hyperbranched and dendritic polymers.

The ratio of the total molecular weight of the arms of a star polymer to the total MW of the core is at least 3:1 or more.

A star polymer with n linear chains is termed an n-arm star. A star polymer can have one molecular species as the core, with the number of repeating units in the arms being variable, or with different repeating units in the arms.

As used herein, the term "polyol" refers to a compound with multiple hydroxyl functional groups available for organic reactions. A molecule with two hydroxyl groups is a diol, one with three is a triol, one with four is a tetraol and so on.

As used herein, a "star polyol" refers to a star polymer in which the essentially linear, polymeric arms bear together a total of three or more hydroxyl groups.

As used herein, the terms "dendritic polymer", "dendrimer", "dendrimeric polymer" refer to a polymer composed of one or more subchains (dendrons) with regular cascade-like branching architecture emanating from a single non-repeating unit. Dendrons are regularly branched chains exclusively having repeating units of connectivity three or higher. Such polymers are not core-link-arm polymers as that term is used herein.

As used herein, the term "hyperbranched polymer" refers to a polymer that is a highly branched, randomly branched macromolecule in which any linear subchain may lead in either direction to at least two other subchains. See also P. J. Flory, J. AM. CHEM. SOC. 1952, 74, 2718, and H. Frey et al., CHEM. EUR. J. 2000, 6, no. 14, 2499 for definitions of dendrimeric and hyperbranched polymers.

As used herein, the term "hyperbranched polyols" refers to hyperbranched polymers in which the polymer is a polyols. Examples of hyperbranched macromolecules include Boltorn® H20, Boltorn® H30, and Boltorn® H40, respectively, available from Perstorp Specialty Chemicals AB, Sweden.

As used in U.S. Pat. App. Pub. No. 2008/0045668 to Eibeck et al., "hyperbranched" refers to the degree of branching, i.e. the average number of dendritic linkages plus the average number of end groups per molecule, is from 10 to 99.9%, preferably from 20 to 99%, most preferably from 20 to 95%. For Eibeck et al. "dendrimeric" means that the degree of branching is from 99.9 to 100%. See H. Frey et al. (1997) ACTA POLYM. 48:30, for the definition of "degree of branching".

In addition, Eibeck et al., id., use the term "hyperbranched polycarbonates" to refer to polymers that are non-crosslinked macromolecules having carbonate and hydroxyl groups that have both structural and molecular non-uniformity. Eibeck et al. asserts that the structure of these macromolecules may be based on a central molecule in the same way as dendrimers are, but the branches may have non-uniform chain length. Secondly, these macromolecules may also have a linear structure with functional pendant groups, or may combine the two extremes, having linear and branched molecular portions.

The Eibeck definitions do not necessarily correspond to those used herein.

Ranges

Any range set forth herein expressly includes its endpoints unless explicitly stated otherwise. Setting forth an amount, concentration, or other value or parameter as a range specifically discloses all ranges formed from any pair of any upper range limit and any lower range limit, regardless of whether such pairs are separately disclosed herein. The processes and articles described herein are not limited to the specific values disclosed in defining a range in the description.

Preferred Variants

The disclosure herein of any variants in terms of materials, methods, steps, values, and/or ranges, etc.—whether identified as preferred variants or not—of the processes, compositions and articles described herein is specifically intended to disclose any process and article that includes ANY combination of such materials, methods, steps, values, ranges, etc. For the purposes of providing photographic and sufficient support for the claims, any such disclosed combination is specifically intended to be a preferred variant of the processes, compositions, and articles described herein.

Generally

Described herein are polyoxymethylene compositions comprising:
(a) from 50 to 99.5 weight percent of at least one polyoxymethylene polymer selected from the group consisting of homopolymer, copolymer and mixtures of these;
(b) from 0.5 to 10 weight percent of at least one polymer;
(c) from 0 to 30 weight percent of one or more fillers; and
(d) from 0 to 10 weight percent of additives,
wherein the total weight percent of (a), (b), (c), and (d) is 100 percent,
wherein the at least one polymer of (b) is selected from the group consisting of:
(I) one or more polymers having a core-link-arm structure such that:
the core comprises one or more carbon atoms, none of which is a carbonate carbon, and is attached to at least three arms;
(II) one or more polymers having a core-link-arm structure such that:
each arm comprises a repeating unit,
the core has a molecular weight of greater than 45, does not comprise the repeating unit of the arm, and is attached to more than one arm; and
the mass ratio of arms to core in the core-link-arm structure is greater than 3; and
(III) one or more polyols having a core-link-arm structure such that:
the core has a molecular weight from 118 to 1000;
each link is selected from the group consisting of a bond, $.O.$, $.CH_2O.$, and any combination of these links; and
(IV) any combination of (I), (II), and (III), and
wherein the number average molecular weight of each arm in the core-link-arm structure of the at least one polymer b) ranges from 500 to 10 000, and preferably from 1800 to 10 000.

Also described herein are processes of making the polyoxymethylene compositions described herein, comprising:
(a) providing:
(i) from 50 to 99.5 weight percent of at least one polyoxymethylene polymer selected from the group consisting of homopolymer, copolymer, and mixtures of these;
(ii) from 0.5 to 10 weight percent of at least one polymer;
(iii) from 0 to 30 weight percent of one or more fillers; and
(iv) from 0 to 10 weight percent of additives, and
(b) combining (i), (ii), (iii) and (iv),
wherein the total weight percent of (i), (ii), (iii), and (iv) is 100 percent,
wherein:
the at least one polymer of (ii) is selected from the group consisting of:
(I) one or more polymers having a core-link-arm structure such that:
the core comprises one or more carbon atoms, none of which is a carbonate carbon, and is attached to at least three arms;
(II) one or more polymers having a core-link-arm structure such that:
each arm comprises a repeating unit,
the core has a molecular weight of greater than 45, does not comprise the repeating unit of the arm, and is attached to more than one arm; and
the mass ratio of arms to core in the core-link-arm structure is greater than 3; and
(III) one or more polyols having a core-link-arm structure such that:
the core has a molecular weight from 118 to 1000; each link is selected from the group consisting of a bond, $.O.$, $.CH_2O.$, and any combination of these links; and
(IV) any combination of (I), (II), and (III), and
wherein the number average molecular weight of each arm in the core-link-arm structure of the at least one polymer (ii) ranges from 500 to 10 000, and preferably from 1800 to 10 000.

Also described herein are processes of making articles comprising the polyoxymethylene compositions described herein comprising:
molding a polyoxymethylene composition to result in an article,
the polyoxymethylene composition comprising:
(a) from 50 to 99.5 weight percent of at least one polyoxymethylene polymer selected from the group consisting of homopolymer, copolymer and mixtures of these;
(b) from 0.5 to 10 weight percent of at least polymer;
(c) from 0 to 30 weight percent of one or more fillers; and
(d) from 0 to 10 weight percent of additives,
wherein the total weight percent of (a), (b), (c), and (d) is 100 percent,
wherein the at least one polymer of (b) is selected from the group consisting of:
(I) one or more polymers having a core-link-arm structure such that:
the core comprises one or more carbon atoms, none of which is a carbonate carbon, and is attached to at least three arms;
(II) one or more polymers having a core-link-arm structure such that:
each arm comprises a repeating unit,
the core has a molecular weight of greater than 45, does not comprise the repeating unit of the arm, and is attached to more than one arm; and
the mass ratio of arms to core in the core-link-arm structure is greater than 3; and
(III) one or more polyols having a core-link-arm structure such that:
the core has a molecular weight from 118 to 1000; each link is selected from the group consisting of a bond, $.O.$, $.CH_2O.$, and any combination of these links; and
(IV) any combination of (I), (II), and (III), and
wherein the number average molecular weight of each arm in the core-link-arm structure of the at least one polymer (b) ranges from 500 to 10,000, and
wherein the molded polyoxymethylene composition exhibits at least one of the properties selected from the group consisting of:
(A) a melt viscosity stability, as measured by ASTM D3835 at 220° C. and 100 $s^{-1}$ shear rate, of greater than −0.005 and a simultaneous increase in notched Izod impact strength, as measured by ASTM D 256-06a, of at least 10 percent when compared to the notched Izod impact strength of a composition consisting of the same polyoxymethylene polymer and the same additives and fillers, measured under the same conditions;

(B) a decrease in relative apparent capillary melt viscosity, as measured by ASTM D-3835 at 220° C. and 55 sec$^{-1}$ shear rate, of at least 40 percent when compared to the relative apparent capillary melt viscosity of a composition consisting of the same polyoxymethylene polymer and the same additives and fillers, measured under the same conditions; and (C) upon being molded into a Type I specimen, an increase in elongation at break, as measured by ASTM D638-08 at a speed of testing of 50 mm per minute, of at least 4 percent when compared to the elongation at break of a composition consisting of the same polyoxymethylene polymer and the same additives and fillers, measured under the same conditions.

Also described herein are articles made from these processes as well as articles comprising the polyoxymethylene compositions described herein.

Also described herein are processes of: obtaining melt viscosity stability while increasing notched Izod impact strength, decreasing relative apparent capillary melt viscosity, and increasing elongation at break. Each of these processes comprise the step of: molding the polyoxymethylene compositions described herein;
wherein the molded polyoxymethylene composition exhibits at least one of the properties selected from the group consisting of:

a melt viscosity stability, as measured by ASTM D3835 at 220° C. and 100 s$^{-1}$ shear rate, of greater than −0.005 and a simultaneous increase in notched Izod impact strength, as measured by ASTM D 256-06a, of at least 10 percent when compared to the notched Izod impact strength of a composition consisting of the same polyoxymethylene polymer and the same additives and fillers, measured under the same conditions;

a decrease in relative apparent capillary melt viscosity, as measured by ASTM D-3835 at 220° C. and 55 sec$^{-1}$ shear rate, of at least 40 percent when compared to the relative apparent capillary melt viscosity of a composition consisting of the same polyoxymethylene polymer and the same additives and fillers, measured under the same conditions; and upon being molded into a Type I specimen, an increase in elongation at break, as measured by ASTM D638-08 at a speed of testing of 50 mm per minute, of at least 4 percent when compared to the elongation at break of a composition consisting of the same polyoxymethylene polymer and the same additives and fillers, measured under the same conditions.

The processes described herein also comprise increasing the notched Izod impact strength of the molded POM compositions described herein as measured by ASTM D 256-06a, by at least 10 percent when compared to the notched Izod impact strength of a molded composition consisting of the same polyoxymethylene polymer and the same additives and fillers.

When molten, the POM compositions described herein can have a polymer melt mass flow rate that ranges from 0.1 to 50 grams/10 minutes, as measured by ASTM D1238-04c at Condition 190° C./2.16 kg.

In addition, POM compositions described herein, upon molding and being tested under Flow Length Test Conditions defined herein, exhibit an increase in flow length of at least 5 percent when compared to the flow length of a molded composition consisting of the same polyoxymethylene polymer and the same additives and fillers, measured under the same conditions.

In the compositions, processes and articles described herein, the core-link-arm structure may vary in the arrangement of the core, the link and the arms relative to each other, that is, may vary in its polymeric architecture. This variation includes the following arrangements:

(A) The core comprises one or more carbon atoms, none of which is a carbonate carbon (OC(=O)O), attached to at least three arms. In addition, the core carbons may optionally not be an ester carbonyl carbon (bolded: OC(=O)C). Plus, in this variation, each link may be a bond; OR (B) Each arm comprises a repeating unit. The core has a molecular weight of greater than 45, does not comprise the repeating unit of the arm, and is attached to more than one arm. The mass ratio of arms to core in the core-link-arm structure is greater than 3; OR (C) The polymer is a polyol in which the core-link-arm structure is such that each core has a molecular weight from 118 to 1000.

Each link is attached to an arm and each link is selected from the group consisting of a bond, .O., .CH$_2$O., and combinations of these. In any of these variations, the number average molecular weight of each arm ranges from 500 to 10 000, and preferably ranges from 1800 to 10 000.

Further, in the compositions, processes, and articles described herein, the core in any of the core-link-arm structures may comprise any integer of carbon atoms from 1 to 500 and/or have a molecular weight of any decimal value from 12 to 10 000, and be linked to any integer number of arms from two to twenty-four by a corresponding number of links. The links may be selected from the group consisting of a bond, .O., .S., .CH$_2$O., .O(C=O)O., .O(C=O)., etc. and combinations of these. When the diradicals comprise two radicals that are different, either radical can join with a core radical, and the other radical correspondingly joins with the arm monoradical.

In any core-link-arm structure described herein, at least one arm attached to a core may have a terminal group selected from the following radicals: .H, .OH, .R, .C(=O) OR, .C(=O)NR$_2$, .C(=O)NHR, .C(=O)NH$_2$, .OC(=O) R, .C(=O)R, .OR, and .X, wherein R comprises an optionally substituted alkyl, cyclic, cycloalkyl, or aromatic group of one to twelve carbons, and X is selected from fluorine, chlorine, bromine, iodine, or combinations of these. The link is preferably not peroxide, that is, a compound containing an oxygen-oxygen single bond or the peroxide anion ([O—O]$^{2-}$).

The number of arms may be any integer from two to twenty-four. The molecular weight of each arm may range from any value from 100 up to 20 000. Preferably, the molecular weight of each arm is from 1800 to 10 000, more preferably from 2000 to 10 000, and yet more preferably, from 2500 to 5000. Each arm may comprise a polyether, and preferably comprises polyethylene oxide.

Compositions Described Herein (a) Polyoxymethylenes [POMS]

The polyoxymethylene polymers used in the compositions, processes and articles described herein include homopolymer, copolymers and mixtures of these. Polyoxymethylene homopolymers include homopolymers of formaldehyde or cyclic oligomers of formaldehyde, e.g., trioxane and tetraoxane.

Polyoxymethylene copolymers include copolymers of formaldehyde or cyclic oligomers of formaldehyde and monomers that yield oxyalkylene groups having at least two adjacent carbon atoms in the polymer chain. Also included are other monomers that yield oxyalkylene groups having at least two adjacent carbon atoms in the polymer chain.

Comonomers can provide linear, branched or crosslinked POM, such as in U.S. Pat. App. Pub. No. 2005/0182200 to Kawaguchi et al. and Eibeck et al., supra. Comonomers commonly used in preparing POM copolymers include those without alkylene oxides and those with alkylene oxides of 2-12 carbon atoms and their cyclic addition products with formaldehyde. The quantity of comonomer is generally not more than about 20 weight percent, preferably not more than about 15 weight percent, and most preferably about 2 weight percent, of the total weight of the POM polymer.

The molten POM compositions described herein and used in the processes and articles described herein can be characterized by a polymer melt mass flow rate, which ranges from any decimal value from 0.1 up to and including 50 grams/10 minutes, as measured by ASTM D1238-04c at Condition 190/2.16.

The amount of one or more POM polymers in these POM compositions ranges from any decimal value from 50 up to and including 99.99 weight percent of the total POM composition, which includes the total of components a), b), c) and d).

(b) Core-Link-Arm [CLA] Polymers

The polymers useful in the compositions, processes, and articles described herein have core-link-arm structures. These polymers are also termed herein as "core-link-arm polymers", abbreviated as CLA polymers. These polymers may be oligomers or polymers of oxymethylene. That is, they may have two or more instances of the repeating unit of $.CH_2O.$, or alternatively may be free of all instances of dimer, trimer, or tetramer of oxymethylene (namely $.CH_2OCH_2O.$, $.CH_2OCH_2OCH_2O.$, or $.CH_2OCH_2OCH_2OCH_2O.$). That is, any of the cores, arms, or links of these polymers may include or not include oligomers or polymers of oxymethylene in any possible permutation.

The CLA polymers can be: block copolymers of ABA or ABC type in which B serves as the core and is directly bonded to either arms A or to arms A and C; or branched macromolecules that have a branched core, two or more arms and links; and/or combinations of these.

Examples of CLA polymers include star polymers with an exact number of arms, for example:
the reaction product of 2,2-bis(hydroxymethyl)-1,3-propanediol with ethylene oxide to form a four arm star with CAS Registry Number [30599-15-6];
the reaction product of triglycerol with ethylene oxide to form a five arm star with CAS Registry Number [185069-79-8];
the reaction product of xylitol with ethylene oxide to form a five arm star with CAS Registry Number [82860-15-9];
the reaction product of arabinitol with ethylene oxide to form a five arm star with CAS Registry Number [185225-73-4];
the reaction product of glucose with ethylene oxide to form a five arm star with CAS Registry Number [61931-73-5];
the reaction product of galactose with ethylene oxide to form a five arm star with CAS Registry Number [879220-91-4];
the reaction product of fructose with ethylene oxide to form a five arm star with CAS Registry Number [185036-03-7];
the reaction product of dipentaerythritol with ethylene oxide to form a six arm star polymer with CAS Registry Number [50977-32-7];
the reaction product of mannitol with ethylene oxide to form a six arm star polymer with CAS Registry Number [57639-81-3];
the reaction product of maltitol with ethylene oxide to form a nine arm star polymer with CAS Registry Number [503446-79-5];
the reaction product of sorbitol with ethylene oxide to form a six arm star polymer with CAS Registry Number [53694-15-8], and,
the reaction product of hexaglycerol with ethylene oxide to form an eight arm star with CAS Registry Number [91372-14-4].

Similar core-link-arm polymers (star polymers) can be formed with propylene oxide, oxetane, tetrahydrofuran or other chain extenders, having arms with polypropylene oxide, polytrimethylene oxide, or polybutylene oxide polymers.

Similar core-link-arm structures or star structures with at least three arms can be formed from compounds with three or more hydroxyl groups such as: glycerol, diglycerol, triglycerol, tetraglycerol, pentaglycerol, hexaglycerol, heptaglycerol, octaglycerol, nonaglycerol, decaglycerol, undecaglycerol, dodecaglycerol, polyglycerols, bis(trimethylolpropane), trimethylolmethane, trimethylolethane, trimethylolpropane, 1,2,4-butanetriol, tris(hydroxymethyl)amine, tris(hydroxyethyl)amine, tris(hydroxypropyl)amine, pentaerythritol, dipentaerythritol, tripentaerythritol, polypentaerythritol, tris(hydroxymethyl)isocyanurate, tris(hydroxyethyl)isocyanurate, phloroglucinol, trihydroxytoluene, trihydroxydimethylbenzene, phloroglucides, hexahydroxybenzene, 1,3,5-benzenetrimethanol, 1,1,1-tris(4'-hydroxyphenyl)methane, 1,1,1-tris(4'-hydroxyphenyl)ethane, ribitol, zylitol, arabinitol, mannitol, mannose, methyl lactoside, methyl cellobioside, methyl maltoside, glucogallin, maltitol, lactitol, glyceryl maltoside, glyceryl cellobioside, glyceryl lactoside, methyl raffinoside, methyl maltotrioside, methyl cellotrioside, raffinose, maltotriose, cellotriose, glyceryl maltotrioside, and the like, or sugars, e.g. glucose and the like, or higher-functionality polyetherols based on trihydric or higher-functionality alcohols, via reaction with ethylene oxide, propylene oxide, or butylene oxide, or the like, as well as mixtures of these.

The compositions, processes, and articles described herein may comprise up any decimal from 0.1 up to and including 10 weight percent of any single or combination of the core-link-arm polymers described herein, including 0.1, 0.2, 0.3, 0.4, 0.5, 0.6, 0.7, 0.8, 0.9, 1.0, 2.0, 3.0, 4.0, and 5.0 weight percent.

Core

The core in the CLA polymers described herein comprises a multiradical of two or more radical groups, preferably three or more radical groups, each of which connects to an arm. The core is formed of core units that may be diradicals, triradicals, etc, which can occur singly or be repeating. A core unit may recur any integer number of times between 2 up to 100, preferably from 2 to 20 times.

The core units that may be repeating are selected from the group consisting of: $.CH_2C(CH_2O.)_3$, $.CH_2C(CH_2O.)_2CH_2O$ $CH_2C(CH_2O_3$, $.CH_2C(CH_2CH_3)(CH_2O.)_2$, $.OCH_2CH(O.)CH_2$, $.CH(O.)CH(O.)$., $.CH(O.)CH(O.)CH(O.)$., $.CH(O.)CH(O.)CH(O.)CH(O.)$., $.CH(O.)CH(O.)CH(O.)CH(O.)$ $(O.)CH(O.)$., $.CH$ $(O.)CH(O.)CH(O.)CH(O.)CH(O.)CH$ $(O.)$., and any combination of these. In some cases it is preferable that certain units are excluded from the core, such as to provide for greater stability of the core-link-arm polymer, the polyoxymethylene polymer, or other additives in the composition. Excluded units may be selected from the group consisting of $.OC(=O)O.$, $.C(=O)O.$, $.CH_2CH_2O.$, $.CH_2CH_2OCH_2CH_2O.$, $.CH_2OCH_2OCH_2O.$, $.NH_2$, $.NRH$, $.CO_2H$, and any combination of these.

The cores of a distribution of core-link-arm polymers may be entirely monodisperse, that is, of one structure, and thus of one molecular formula and weight, or, alternatively, have varying numbers of repeating units.

The core can comprise carbon, which may have single bonds, radicals or any combination of single, radical, and multiple bonds, which attach either to the links or directly to the arms. Multiple bonds to carbon may include or exclude those to other carbon, oxygen, or nitrogen atoms. Aromatic structures may be included or excluded from the core.

Besides having carbon, the core may include or exclude oxygen, nitrogen, hydrogen, sulfur, fluorine, chlorine, combinations of these, as well as other atoms. The bonds between core atoms may be any known in the art. Rings, such as those of three, four, five, six, and greater than six ring atoms but fewer than 40 ring atoms, may be present or absent in the core.

The core may be a multiradical having any integer number of radicals from two up to and including twenty-four. The core therefore may be linked to any integer number of arms from two up to and including twenty-four. The number of core carbon atoms may range from any integer value from 1 up to and including 500.

ABA and ABC block copolymers are examples of core-link-arm polymers in which the B segment is a diradical core, meaning that the core has two radical groups, which are attached to two arms, respectively. The B unit of the polymer is the core and the polymer comprises the same ("A") or different repeating units ("A" and "C"), respectively. Using block copolymers facilitates the creation of core-link-arm structures, which homopolymers or random copolymers do not have. To be clear, homopolymers and random copolymers cannot be core-link-arm polymers.

When the CLA polymer contains three or more arms, the core is branched in any manner recognized in the art, such as star branching, comb branching, dendritic branching, and hyper branching. The branching atom can be carbon or nitrogen or other atom. When the core is monodisperse, individual CLA polymers in a sample possess a core of the same length as any other core in that sample.

When the core is oligomeric and not monodisperse, there are two ways of describing a sample or distribution of CLA polymers. Because of the core polydispersity, individual CLA polymers in a sample may actually possess a core of the same or different length as any other core in that sample.

For example, eight-arm CLA polymers arise from hexaglycerol. A sample of an eight-arm CLA polymer derived from a population of oligoglycerols may, however, include CLA polymers having fewer than or greater than eight arms. The oligoglycerols from which the CLA polymer arose may have had cores larger or smaller than that of pure hexaglycerol. Thus, there are various ways to describe a sample of an eight-arm CLA polymer containing twenty percent CLA polymers having seven arms, twenty percent having nine arms, and the remaining sixty percent having eight arms:
(1) as a CLA polymer having, on average, eight arms; OR
(2) as a distribution of CLA polymers having on average eight arms; OR
(3) as a mixture of different CLA polymers: twenty percent of seven-arm CLA polymers, twenty percent of nine-arm CLA polymers and sixty percent of eight-arm CLA polymers. The preferred description is given in (1).

Also, when oligomeric, the core may exist in any one of several structural isomers. For example, hexaglycerol may be linear, branched, or cyclic, and bonds connecting glycerol moieties may involve the oxygen atoms derived from either the primary or secondary hydroxyl groups of glycerol.

The molecular weight of the core can from range from any value from 12 up to and including 10,000. Cores in the CLA polymers may be of the same or different molecular weight. The ratio of weight average to number average molecular weight of the cores—also termed polydispersity—can be any decimal value from 1 up to and including 5.

Link

The link in a CLA polymer attaches the core to an arm. It can be a single bond or two bonds separated by intervening atom(s). When a single bond, the link is formed by combining a core radical with an arm radical. When two bonds separated by intervening atom(s) or functional group, the link constitutes a diradical, in which the first radical is bonded to a core radical and the second radical is bonded to the arm monoradical. Examples of such links are bolded in the following: (arm..O.)$_n$core (ether links), (arm..S.)$_n$core (thioether links), (arm..O(C=O)O.)$_n$core (carbonate links), (arm..O(C=O).)$_n$core (oxycarbonyl links), (arm..(C=O)O.)$_n$core (carbonyloxy links), (arm..CH$_2$O.)$_n$core (methyleneoxy links), (arm..OCH$_2$)$_n$core (oxymethylene links), etc., or any combination of these. The various links in a core-link-arm polymer may be the same or different or a combination of these, where n is the number of arms. A link in a core-link-arm polymer may be the same or different as any other link in the polymer. Preferably, the link does not result in the formation of O—O or S—S bonds between the arm and the core.

Arm

Each arm in a CLA polymer described herein comprises a linear polymer monoradical, which has a terminal group and may have repeating units, i.e., monomeric units. The terminal group of the arm may or not directly attach to the core. When the arm has repeating units, the terminal group is attached to the repeating unit that is distal to the core. Thus, each arm in a CLA polymer described herein may be essentially linear. When the CLA polymers described herein comprise arms that are entirely linear, the number of terminal groups equals the number of arms.

Different arms attached to a single core can have the same or different number of repeating units as well as the same or different terminal groups as any other attached arm. Terminal groups may include or exclude the following radicals: .H, .OH, .R, .C(=O)OR, .C(=O)NR$_2$, .C(=O)NHR, .C(=O)NH$_2$, .OC(=O)R, .C(=O)R, .OR, and .X, wherein R comprises an optionally substituted alkyl, cyclic, cycloalkyl, or aromatic group of one to twelve carbons, and X is selected from fluorine, chlorine, bromine, iodine, or combinations of these. The repeating unit of the arm may be selected according to the following conditions:
(1) the link or terminal group of the arm has as few atoms as possible, which in effect maximizes the number of repeating units of the arms; OR
(2) the terminal group monoradical bonds directly to the core, which means that the arm has zero repeating units; OR
(3) the arm has been selected as having some number of repeating units between the maximum of (1) and the minimum of (2).

The arm repeating units can be diradicals of any sort, such as from ethylene oxide, propylene oxide, butylene oxide, or other units of condensation or free-radical polymerization, such as from caprolactam, capralactone, methacrylic esters and the like. The repeating unit of an arm in a core-link-arm polymer may be the same as or different from that of any other arm and/or the same as or different from a core unit or a link unit.

There may be as few as two arms and as many as twenty-four arms attached to a core, depending on core structure, the number of branching atoms in the core, and the manner of growing and attaching arms to the core.

Arms attached to the same core may have the same or different molecular weight. The polydispersity, that is, the ratio of weight average to number average molecular weight, can be any decimal value from 1 up to and including 5. The molecular weight of any arm in a core-link-arm polymer can be any value from 100 up to and including 20 000. Preferably, the molecular weight of each arm ranges from 1800 to 10 000, more preferably from 2000 to 10 000, still more preferably from 2500 to 10 000 and yet more preferably from 2000 to 5000.

Mass Ratio of Arms to Core

Manipulating the mass ratio of arms to core in these CLA polymers changes the flowability of the POM compositions to which the CLA polymers are added. As used herein, the term "mass ratio of arms to core" refers to the following formula:

$$\frac{(\text{Molecular Mass of CLA structure} - \text{Molecular Mass of core}) - \text{Molecular Mass of Links}}{\text{Molecular Mass of Core}}$$

When the links in the CLA structure are bonds only, the Molecular Mass of the Links equals zero. For any CLA polymer, the mass ratio of arms to core can be any positive decimal value. A preferred mass ratio of arms to core is a decimal value from 1 up to and including 200, particularly from 3 up to and including 100, more particularly from 5 up to and including 80.

Making Polymers Having Core-Link-Arm Structure

At least three methods can be used to make core-link-arm polymers: 1) covalently attaching a core to arms already formed; 2) growing arms out of a core; and 3) forming a core from arms. Such techniques are discussed further in Grzegorz Lapienis (2009) *Star-shaped polymers having PEO arms*, PROGRESS IN POLYMER SCIENCE 34:852-892. More specifically, these methods include: forming arms by chain extension from a previously formed core; forming cores through reactions adjoining multiple, previously formed arms; simultaneously forming a core and arms and joining them in a single step; and, importantly, combining a previously formed core with previously formed arms by condensation or displacement reactions.

Arms can be covalently attached to the core by any of various reactions, such as by a condensation reaction as when a carboxylic acid and a hydroxyl group on a carbon combine to form ester and water—or by a displacement reaction like nucleophilic displacement, as when a bromine group on a carbon is displaced by a carboxylate to form ester and a bromide ion.

Arms can be grown from a core by polymerizing monomers onto reactive groups attached to the core. For example, pentaerythritol which contains a $C(CH_2)_4$ core attached to .OH groups can be chain extended to give polyethylene oxide arms by reaction with ethylene oxide. U.S. Pat. No. 6,147,048 to Huff et al. and U.S. Pat. No. 7,589,157 to Zhao et al. disclose methods of making core-link-arm polymers in this way.

Arms can be reacted to form a core if they contain functional groups capable of dimerizing or oligomerizing with each other. For example, arms ending with alkene and diene groups can combine in a Diels-Alder reaction or by oligomerization.

Variability of Core-Link-Arm Polymers

FIGS. 1 to 3 and their accompanying description illustrate that the core-link-arm structures in a CLA polymer may be described variously, depending on how one identifies the core in relation to the links and/or the arms, even though the overall chemical structure of the CLA polymer remains the same. In FIGS. 1-3, not all hydrogens ["H"] are shown and any arm depicted in these figures may be the same as or different from any other arm.

FIG. 1 illustrates polymers 100, 150, and 170, each having 8 arms and links that are only bonds. Each polymer has a star architecture. Each polymer has a different core structure and therefore different arm regiochemistry.

Figure 1B:
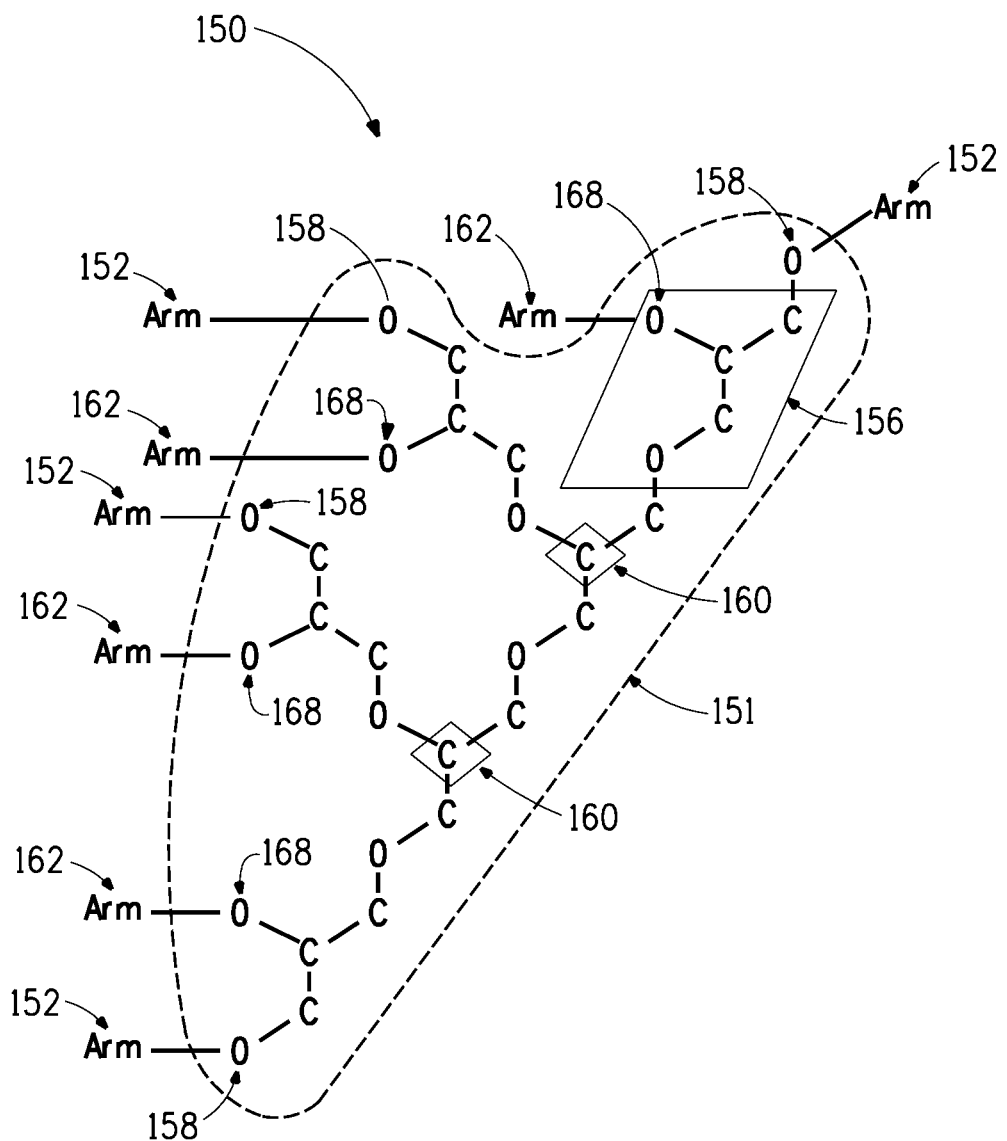
Figure 1C:
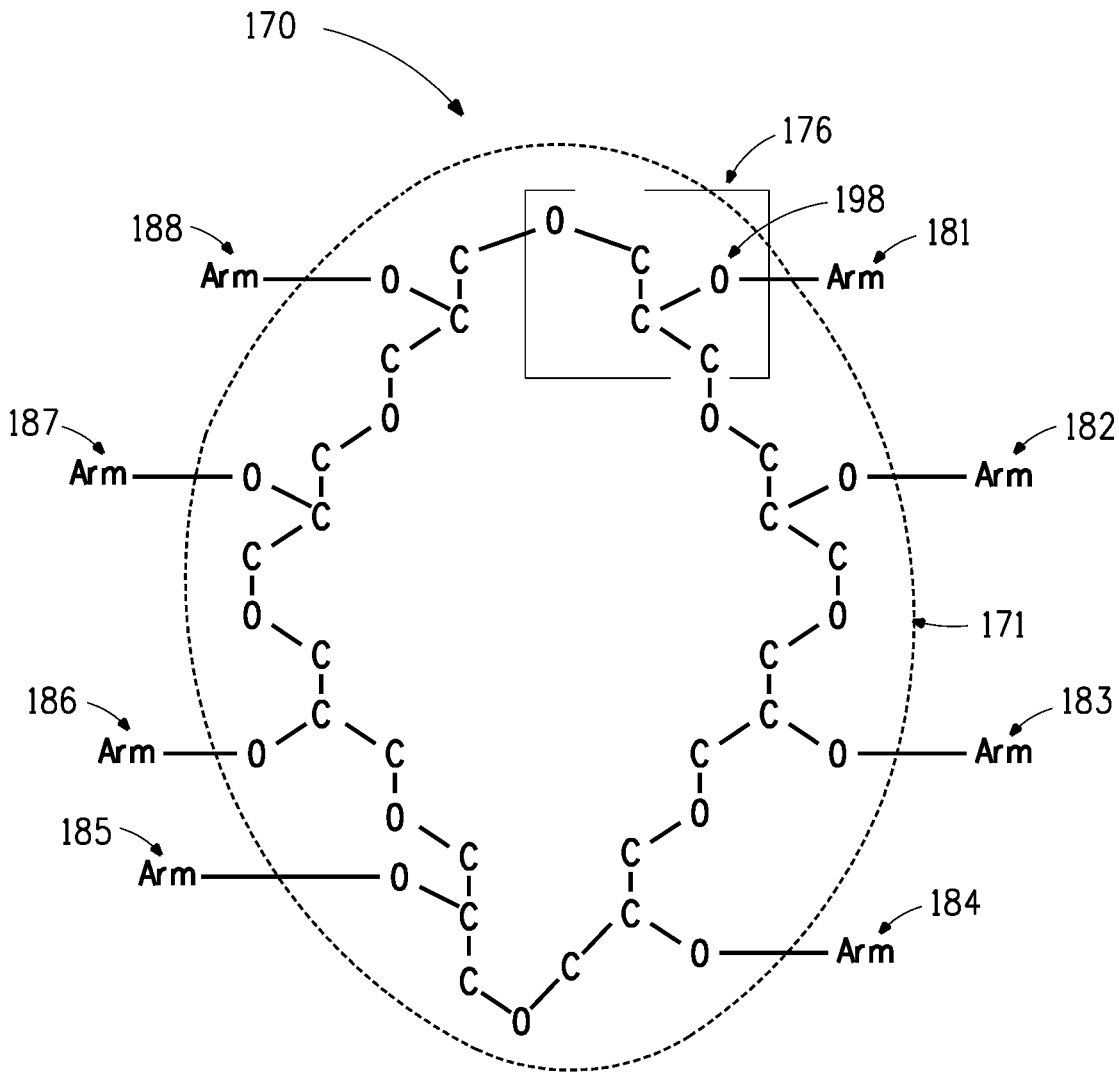

FIG. 1 illustrates some of the possible variability in core-link-arm structures made from commonly available oligoglycerol mixtures. When such mixtures are used as the core from which to grow arms, they yield 8-arm polymers. In particular, FIG. 1A demonstrates variability in terminal connectivity; FIG. 1B illustrates variability in branching; and FIG. 1C illustrates that the core can be cyclic. In addition, the cores of FIGS. 1A and 1B depict structural isomers of each other.

FIG. 1A shows polymer 100 having core 101, encircled by dashes. Core 101 includes a linear chain of six glycerol triradicals, five repeating core units of $.OCH_2CH(O.)CH_2.$ (e.g. 106, 126), and one core unit of $.OCH_2CH(.)CH_2O.$ (116). Arms 102, 112, 122, and 132, whose chemical formula is not shown, are attached to glycerol triradicals 106, 116, and 126, respectively. (Arm 132 and arm 122 are each attached to triradical 126). Other arms are shown, but not numbered. Specifically, arm 102 is attached to the internal glycerol triradical 106 at internal oxygen 108. Arm 112 is attached to the terminal glycerol triradical 116 at terminal oxygen 118. Arm 132 is attached to the terminal glycerol triradical 126 at internal oxygen 128. Three arms are attached to $CHCH_2O.$ groups, e.g. arm 112 to triradical 116, and arm 122 to triradical 126. Five arms are attached to $(CH_2)_2CHO.$ groups, e.g. arm 102 on triradical 106, and arm 132 on triradical 126.

FIG. 1B shows polymer 150 having core 151, encircled by dashes. Core 151 is branched and has six glycerol triradicals $.OCH_2CH(O)CH_2.$, only one of which is numbered as 156, and two internal branch points 160. Arms 152 are attached to a terminal glycerol triradical at terminal oxygen 158. Arms 162 are attached to a terminal glycerol radical at internal oxygen 168.

FIG. 1C shows polymer 170 having core 171, encircled by dashes. Core 171 is a cycle of 8 symmetrically disposed glycerol triradicals $.OCH_2CH(O.)CH_2.$, only one of which is numbered as 176. Each of arms 181-188 is attached to an internal glycerol triradical at internal oxygen 198, only one of which is numbered.

In sum, FIG. 1 illustrates some of the variability in defining the core-link-arm structure, for oligoglycerol based cores, especially, as illustrated here, for an 8-arm polymer. FIG. 1, as a whole, demonstrates the variability in terminal connectivity, branching, and cyclization of the core.

FIG. 2 illustrates polymer 200 having a core-link-arm structure, in which the polymer structure is a star having 4 arms. In both FIGS. 2A and 2B, not all hydrogens ["H"] are shown.

In FIG. 2A, polymer 200 has core 210, which corresponds to $C(CH_2O.)_4$. Links 212 do not comprise atoms but correspond to the bond between O (242) and C (240): O.+.C. Only one 242 and one 240 are numbered. Links 212 do not signify a reaction per se, but are rather a structural entity. That is, a link can be a bond formed by combining a radical termination of the core with a radical termination of the polymer arms. Only one of the four arms is numbered as 226. Each of the four arms comprises the same diradical repeating unit, numbered here as, 214, 216, 218, 220, and the same terminal monoradical 222, only one of which is numbered. However, as shown, each of the four arms may comprise a different number of repeating units, identified as n, o, p, and q, respectively. To be clear, n, o, p, and q may be the same or different and thus each of the four arms may have the same or different number of repeating units. Thus, each arm in polymer 200 may have a different or the same length as any other arm of the polymer. The terminal monoradical 222 corresponds to a hydrogen radical, .H.

Now referring to FIG. 2B, polymer 200 possesses the same chemical elements as FIG. 2A. Nonetheless the core, the links and the arms are each not identified in the same way as in FIG. 2A, Thus, the core-link-arm structures of FIGS. 2A and 2B are different even though the chemical structure of the core-link-arm polymers in FIGS. 2A and 2B is the same.

In particular, core 260 corresponds to $C(CH_2.)_4$. Polymer 200 is identified as having arms 276, only one of which is numbered. Arm 276 is identified differently from arm 226 in FIG. 2A by having one more oxygen. Diradical repeating unit 266 of arm 276 corresponds to $.CH_2CH_2O.$, which, although identical to repeating unit 216 of FIG. 2A, differs in orientation. Each of the four arms comprises the same diradical repeating unit, numbered here as, 264, 266, 268, 270, and the same terminal monoradical 272, only one of which is numbered. The diradical repeating units are oriented differently than in FIG. 2A, and terminal monoradical 272 is .OH. The arms are attached to core 260 by links 262. Again, each of the four arms may comprise the same or a different number of repeating units, identified as n, o, p, and q, respectively.

Links 262 bond the core carbon to oxygen radicals on the arm terminal group, which are defined differently than in FIG. 2A. To be clear, links 262 as bonds are not the same bonds as links 212.

A comparison of FIG. 2A with FIG. 2B shows different ways of identifying the core-link-arm structures of polymer 200 and illustrates that, for any one core-link-arm polymer, different ways of identifying the core, the link and the arms exist.

Figure 3A:
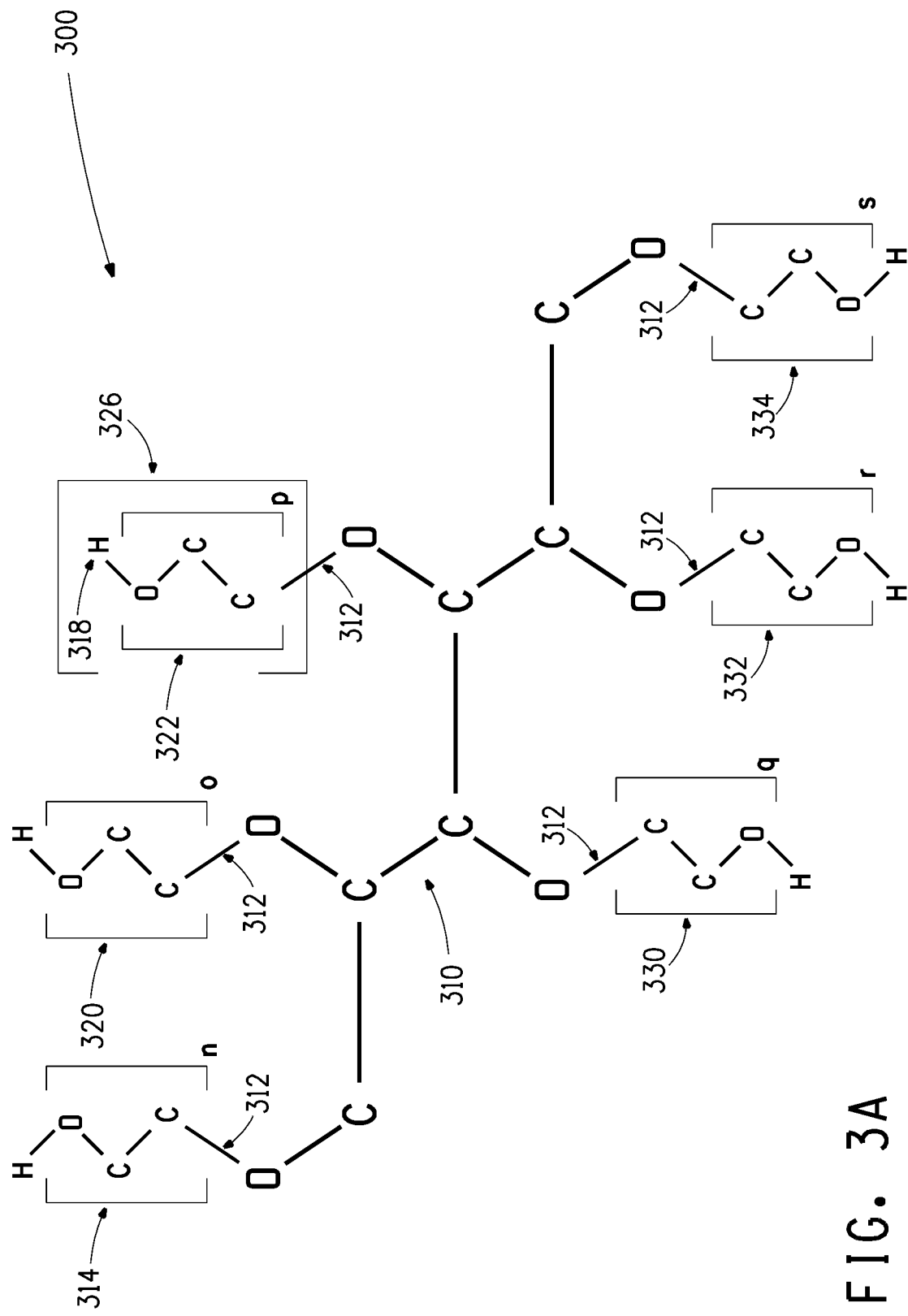
FIG. 3 illustrates a polymer having a core-link-arm structure that is a star polymer having 6 arms.
Figure 3B:
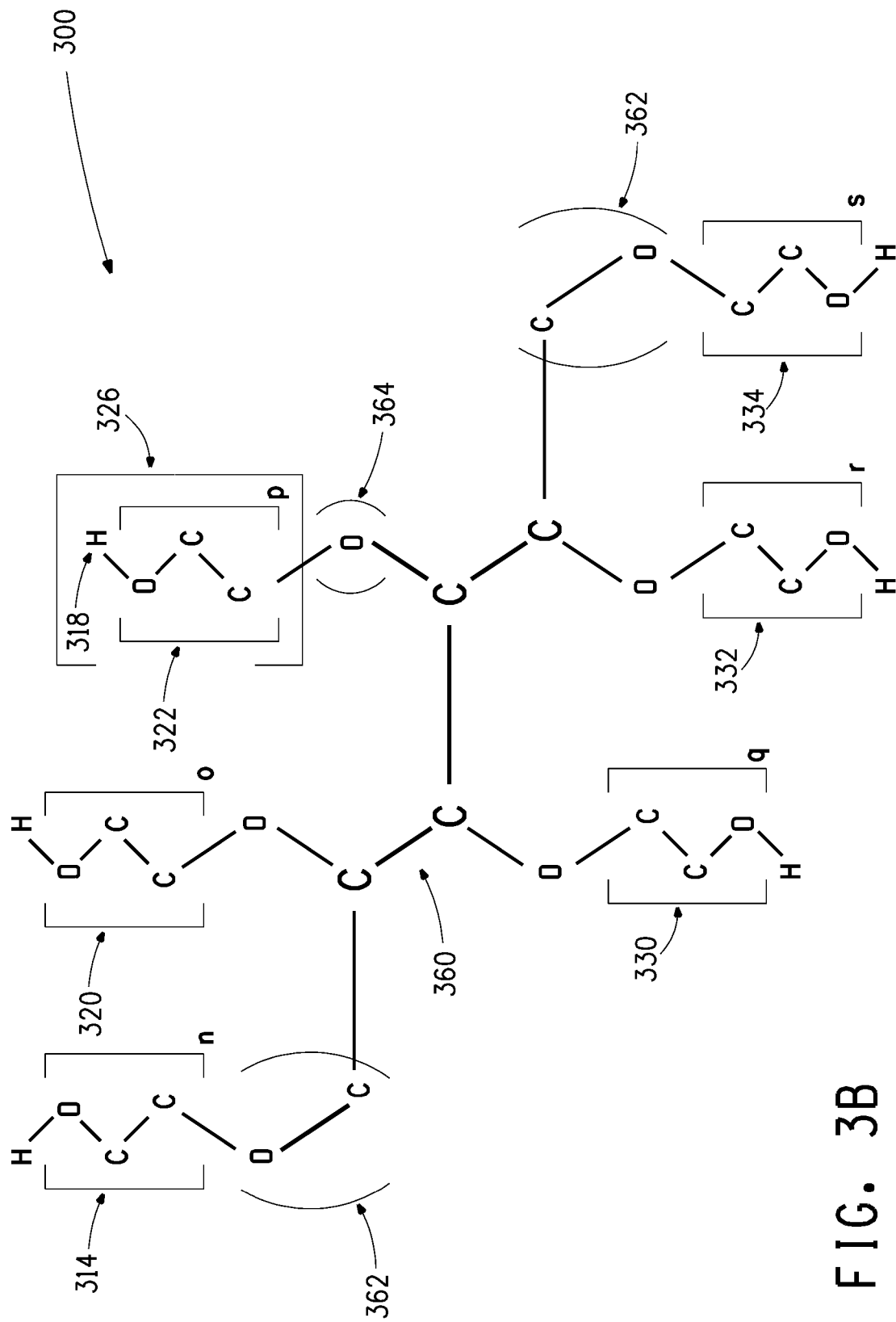

FIG. 3 illustrates a polymer having a core-link-arm structure that is a star having 6 arms. The differences between FIG. 3A and FIG. 3B point out there are different ways to identify the core relative to the links.

Referring now to FIG. 3A, polymer 300 has core 310, which is bolded and is $.OCH_2CH(O.)CH(O.)CH(O.)CH(O.) CH_2O..$ Links 312 do not comprise atoms but are in effect the bonds formed by combining a radical of the core with an arm monoradical. Each of the six arms, only one of which is numbered as 326, comprises a diradical repeating unit and a terminal mono radical. Each of the six arms comprises the same diradical repeating unit, numbered here as 314, 320, 322, 330, 332, and 334, and the same terminal monoradical 318, only one of which is numbered, and which corresponds to a hydrogen radical, .H. The number of repeating units is n, o, p, q, r, and s, respectively, which may be the same or different and thus each of the six arms may have the same or different number of repeating units. Thus, each arm in polymer 300 may have a different or the same length as any other arm of the polymer.

Now referring to FIG. 3B, polymer 300 possesses the same chemical elements as the polymer depicted in FIG. 3A. Nonetheless the core and the links are not identified in the same way as in FIG. 3A. The arms and their repeating units are identified in the same way as in FIG. 3A.

Core 360 of polymer 300 is bolded and is $.CH(.)CH(.)CH (.)CH(.)..$ Core 360 has been identified to be smaller compared with core 310 of FIG. 3A, which in turn has changed the links in FIG. 3B. Two links 362 comprise diradical $.CH_2O.$, in which the $CH_2$ is attached to core 360 and the O. radical is attached to the arm. The other four links comprise diradical .O. 364, only one of which is labeled.

A comparison of FIG. 3A with FIG. 3B shows different ways of identifying the core-link-arm structures of polymer 300. In particular, in FIG. 3A, core 310 of polymer 300 includes six instances of O.. Alternatively, in FIG. 3B, core 360 of polymer 300 does NOT include any O. and there are two kinds of links; one is 362 and the other is 364. Thus, FIG. 3 clearly shows that the link may be identified so as to comprise different numbers of atoms.

In summary, FIGS. 1 to 3 illustrate that core, links and arms of a core-link-arm polymer may be identified in different ways to result in different core-link-arm structures, that is, in different architectures, even though their chemical structure is the same.

Besides the differences in the ways of identifying core-link-arm structures, the ways of forming the polymer can also introduce variability in how the core is linked to the arms as well as in the precise number of arms in the CLA polymer.

If a pre-formed core is the base from which to grow arms and if every possible arm-growing site of the core is used, then the number of arms of the CLA polymer is precisely determined. If all possible arm-growing sites are not used, then the number of arms of the CLA polymer will, on average, be fewer than expected. The pre-formed core may also be oligomeric and not monodisperse, as discussed above. The population of CLA polymers produced by growing arms from such a core will contain some polymer molecules having fewer than the average number of arms and some polymer molecules having more than the average number of arms.

When pre-formed arms combine to form the core, the resulting population of core-link-arm polymers may be monodisperse in the number of arms, or it may be polydisperse in the number of arms.

When the polymer is created by both growing arms from the core and forming the core from preformed arms, the core of the resultant CLA polymers may be polydisperse in the number of arms, exhibiting a range of numbers of arms.

In simple terms, if an 8-arm CLA polymer is made by an arm growing or core growing process, the resulting sample may exhibit a distribution of individual polymers that have fewer than 8-arms, exactly 8-arms, or more than 8-arms. That is, the sample of an "8-arm polymer" may actually contain 4-arm polymers, 6-arm polymers, 8-arm polymers, 12-arm polymers, etc.

(c) and (d) Fillers and Additives

In addition to the compositions, processes, and articles described herein can include fillers. As used herein, the term "filler" refers to additives that generally retain their original, typically small, particle size when added to the composition as well as during processing the composition into an article. Fillers include, but are not limited to: glass such as fibers; calcium carbonate; oxides such as alumina, silica, and titanium dioxide; sulfates such as barium sulfate; titanates; kaolin clay and other silicates; magnesium hydroxide; talc; wollastonite; minerals; reinforcing agents; inorganic and organic pigments; graphite; carbon fiber; and carbon black.

As opposed to fillers, the term "additives" as used herein refers to those additional components that typically change their original size or form when mixed or processed with other components of the composition, for example by dissolving, solubilizing, emulsifying, or breaking up. Additives exclusive of fillers include, but are not limited to: polymers; resins; stabilizers, such as thermoplastic polyurethane; modifiers; co-stabilizers; processing stabilizers; heat stabilizers; weather (light-resistant) stabilizer; antioxidants; colorants; UV stabilizers; toughening agents; nucleating agents; lubricants; mold release agents; plasticizers; antistatic agents; and surfactants. See U.S. Pat. Nos. 3,960,984; 4,098,843; 4,766,168; 4,814,397; 5,011,890; 5,063,263; and 5,318,813, The fillers and additives disclosed herein or known in the art, either singularly or in any combination may comprise any decimal amount from 0 up to 40 weight percent of the POM composition, that is, up to 30 weight percent fillers and up to 10 weight percent additives.

A way that additives, fillers, and CLA polymers can destabilize melt viscosity of POM compositions is by reaction of one or more of their chemical groups with the POM. This may lead to a breakdown in POM molecular weight, resulting in a lowering of viscosity of the melt, and often decreasing the values of physical properties of articles molded from the POM compositions described herein having an altered polyoxymethylene polymer. Therefore, additives that preserve melt stability are preferred in these POM compositions.

Making POM Compositions Described Herein and Articles Therefrom

The POM compositions described herein are melt-mixed blends, wherein all the polymeric components are well-dispersed within each other and all the non-polymeric ingredients are well-dispersed in and bound by the polymer matrix, such that the blend forms a unified whole. They are made by blending the components in any order or combination, at any convenient temperature, such as ambient, or 170° C. to 240° C., and preferably from about 190° to 220° C., when some components will be fluid.

Any melt-mixing method may be used to combine the polymeric components and non-polymeric components. For example, the polymeric components and non-polymeric ingredients may be added to a melt mixer, such as a single or twin-screw extruder; a blender; a single or twin-screw kneader; or a Banbury mixer, either all at once through a single step addition, or in a stepwise fashion, and then melt-mixed. When adding the polymeric components and non-polymeric ingredients in a stepwise fashion, part of the polymeric components and/or non-polymeric ingredients are first added and melt-mixed with the remaining polymeric components and non-polymeric ingredients being subsequently added and further melt-mixed until a well-mixed composition is obtained. When long fillers such as long glass fibers are used in the composition, pultrusion may be used to prepare a reinforced composition. Pellets of these compositions can be made.

The POM compositions described herein may be shaped into articles using methods known to those skilled in the art, such as injection molding, blow molding, injection blow molding, extrusion, thermoforming, melt casting, vacuum molding, rotational molding, calendar molding, slush molding, filament extrusion and fiber spinning. Such articles may include films, fibers and filaments; wire and cable coating; photovoltaic cable coating, optical fiber coating, tubing and pipes; fabrics, nonwovens or textiles made from fibers and filaments, e.g., used in clothings or carpets; films and membranes, such as breathable membranes in roofing and building/construction; motorized vehicles parts such as body panels, dashboards; components for household appliances, such as washers, dryers, refrigerators and heating-ventilation-air conditioning appliances; connectors in electrical/electronic applications; components for electronic devices, such as computers; components for office-, indoor-, and outdoor-furniture; a gear; a conveyor belt part; a bearing; a container for fuel; a part for an automotive safety restraint system; a pharmaceutical dispenser; a medical injection device; a clamp; a clasp; a binding; and a part for a lighter.

The POM compositions described herein are useful to make articles from molds that have at least one channel that requires a molten polymer having a melt flow rate of greater than 2.5. This usefulness arises because these POM compositions have stable melt viscosity at the same time that they exhibit increasing notched Izod impact strength over that of polyoxymethylene compositions not having the CLA polymers described herein.

Processes Described Herein

Described herein are processes of: obtaining melt viscosity stability while increasing notched Izod impact strength, decreasing relative apparent capillary melt viscosity, and increasing elongation at break, each of which comprise the steps of: molding the polyoxymethylene compositions described herein;

wherein the molded polyoxymethylene composition exhibits at least one of the properties selected from the group consisting of:

a melt viscosity stability, as measured by ASTM D3835 at 220° C. and 100 $s^{-1}$ shear rate, of greater than −0.005 and a simultaneous increase in notched Izod impact strength, as measured by ASTM D 256-06a, of at least 10 percent when compared to the notched Izod impact strength of a molded composition consisting of the same polyoxymethylene polymer and the same additives and fillers, measured under the same conditions;

a decrease in relative apparent capillary melt viscosity, as measured by ASTM D-3835 at 220° C. and 55 $sec^{-1}$ shear rate, of at least 40 percent when compared to the relative apparent capillary melt viscosity of a molded composition consisting of the same polyoxymethylene polymer and the same additives and fillers, measured under the same conditions; and upon being molded into a Type I specimen, an increase in elongation at break, as measured by ASTM D638-08 at a speed of testing of 50 mm per minute, of at least 4 percent when compared to the elongation at break of a molded composition consisting of the same polyoxymethylene polymer and the same additives and fillers, measured under the same conditions.

Stabilizing the Melt Viscosity While Improving Notched Izod

Melt viscosity stability is a measurement of the rate of change over time of resistance to flow under shear of a molten polyoxymethylene composition under a described set of conditions, e.g., temperature and shear rate.

Stability in melt viscosity of POM compositions is important for molding. This property facilitates an uninterrupted, on-going molding process of a molten composition without requiring a change in the operational conditions such as molding pressure, molten pool temperature, mold temperature, etc. When a POM composition exhibits melt viscosity stability during molding, the efficiency of the overall molding operation may be optimized.

As clarified in appendix X1 of ASTM D3835, melt viscosity stability ["S"] is determined by plotting four or more melt viscosity values (Pa·s) as a function of time (minutes) and at a given temperature and shear rate on semilogarithmic paper; thus, S is derived experimentally.

As for the meaning of different values of S: when S is 0, the experimentally determined melt viscosity of the molten composition remains essentially constant for the duration of the test. When S is greater than zero, viscosity of the composition tends to increase with time. When S is negative, viscosity of the composition tends to decrease with time.

Large values of S indicate instability of the polymeric composition, which can be generally undesirable. In particular, a large negative value, such as less than −0.01, can indicate a breakdown in the molecular weight of a polymer, e.g., the POM polymer. A large positive value, such as greater than 0.005, can indicate cross linking or branching reactions that increase the molecular weight of components of the composition.

Since stabilizing melt viscosity of a POM composition facilitates maximization of the use of the article mold, an S-value that is relatively close to zero in absolute value is desired for a POM composition. The processes described herein comprise the steps of molding the POM compositions described herein. Such molded compositions exhibit a melt viscosity stability (as measured by ASTM D3835 at 220° C. and 100 $s^{-1}$ shear rate) of greater than −0.005 as well as a simultaneous increase in notched Izod impact strength of at least 10 percent when compared to the notched Izod impact strength of a molded composition consisting of the same polyoxymethylene polymer and the same additives and fillers, measured under the same conditions. The melt viscosity stability of these POM compositions may range from −0.005 to +0.005.

Using the POM compositions described herein enhances the efficiency of the overall molding operation and processability and simultaneously results in articles of increased Notched Izod impact strength.

Improving Relative Apparent Capillary Melt Viscosity and Flow Length

In general, melt viscosity is a measurement of the resistance to flow under shear of a molten POM composition under a described set of conditions, e.g., temperature and shear rate. Melt viscosity can be measured by the method of ASTM D3835, "Standard Test Method for Determination of Properties of Polymeric Materials by Means of a Capillary Rheometer". The measurement is referred to as apparent capillary melt viscosity [ACMV] because no correction is made for the entrance and exit pressure losses and the shear rate is not corrected for non-Newtonian flow of the polymer melts.

In general, the decrease in apparent capillary melt viscosity of Composition 1 relative to that of Composition 2 is calculated by the following:

$$\frac{ACMV_{comp1} - ACMV_{comp2}}{ACMV_{comp2}} \times 100\%$$

In order to confirm comparability of ACMV values, the compared POM compositions should differ by only that element responsible for affecting apparent capillary melt viscosity. In essence, determining "relative" apparent capillary melt viscosity is done when Composition 2 is a comparative example composition that does not contain an additive expected to affect ACMV values. To be clear, for the compositions, processes, and articles described herein, "'relative" apparent melt viscosity is calculated by subtracting from the ACMV of an exemplary molded composition the ACMV of a relevant comparative example and dividing that result by the ACMV of the relevant molded comparative example.

Related to apparent capillary melt viscosity, flow length is an empirically observed measurement under specific conditions. Measuring flow length involves pumping a hot composition into an actual mold and having the composition flow freely within the mold until it solidifies. The greatest distance of flow within the mold is that composition's flow length under the observed temperature, injection velocity and peak pressure. Even though the precise mathematical relationship between apparent capillary melt viscosity and flow length is not determinable, both the flow length, which is observed in a specific, unique mold, and the apparent capillary melt viscosity (measured in a capillary) reflect the flowability of a composition.

The processes described herein achieve improved relative apparent capillary melt viscosity and flow length by: providing POM compositions having the core-link-arm polymers described herein and molding articles from these compositions. Improved relative apparent capillary melt viscosity can facilitate the flow of molten compositions during the molding process, promoting an ever increasing intricacy of article molds, and ultimately providing superior, better designed articles. Moreover, these processes may also achieve simultaneous improvement in the values of physical properties, such as notched Izod and elongation at break.

Molded POM compositions described herein exhibit a decrease in relative apparent capillary melt viscosity, as measured by ASTM D-3835 at 220° C. and 55 $sec^{-1}$ shear rate, of at least 40 percent when compared to the relative apparent capillary melt viscosity of a molded composition consisting of the same polyoxymethylene polymer and the same additives, measured under the same conditions. A decrease in relative apparent capillary melt viscosity results in a less viscous molded composition and is therefore measured as a negative number. In particular, FIG. 5 shows values of relative apparent capillary melt viscosity for various molded POM compositions.

A decrease in relative apparent capillary melt viscosity enables thinner articles with more intricate and complex concavities or convexities to be molded, while still retaining impact strength. The processes described herein for decreasing relative apparent capillary melt viscosity and for increasing flow length report on different aspects of the same overarching property, that is, the flowability of these POM compositions.

Improving Elongation at Break

Elongation at break is a measurement of deformation that an article undergoes before catastrophic failure, i.e., break. Elongation at break measures the total deformation of the test specimen at rate of deformation of approximately 1 percent strain/second. Thermoplastic materials with higher values of elongation at break are better able to resist catastrophic failure under dynamic loading conditions and also under creep loading. For example, gears molded out of improved elongation at break materials have a longer lifetime to failure.

The methods described herein achieve improved elongation at break by: wherein when molded into a Type 1 specimen, the molded POM compositions described herein exhibit an increase in elongation at break, as measured according to ASTM D638-08 at a speed of testing of 50 mm per minute, of at least 4 percent when compared to the elongation at break of a molded composition consisting of a composition consisting of the same polyoxymethylene polymer and the same additives and fillers, measured under the same conditions.

Improving elongation at break facilitates the design of plastic articles and articles that can withstand greater strain at break. In particular, improving elongation at break can provides gears whose teeth can experience greater strain before breaking.

The methods described herein also achieve an increase in notched Izod impact strength by molding POM compositions described herein, wherein the molded POM composition exhibits an increase in notched Izod impact strength, as measured by ASTM D 256-06a, of at least 10 percent when compared to the notched Izod impact strength of a molded composition consisting of the same polyoxymethylene polymer and the same additives and fillers.

In any of these methods described herein, the POM compositions when molten can have a polymer melt mass flow length that ranges between 0.1 to 50 grams/10 minutes, as measured by ASTM D1238-04c at Condition 190° C./2.16 kg.

In addition, the POM compositions provided in these methods may comprise all variations described above, including:
that the core comprises from 4 to 40 carbon atoms;
that the core of the polymer structure (A) or (B) has a molecular weight from 118 to 1000; that the core comprises one or more units selected from the group consisting of: .CH$_2$C (CH$_2$O.)$_3$, .CH$_2$C(CH$_2$CH$_3$)(CH$_2$O.)$_2$, .OCH$_2$CH(O.)CH$_2$., .CH(O.)CH(O.)., and .CH(O.)CH(O.)CH(O.).;
that the core is free of one or more units selected from the group consisting of: .OC(=O)O., .C(=O)O., .CH$_2$CH$_2$O., .CH$_2$CH$_2$OCH$_2$CH$_2$O., and .CH$_2$OCH$_2$OCH$_2$O.; that the links are selected from the group consisting of a bond, .O., .CH$_2$O., and combinations of these;
that at least one arm attached to the core of the core-link-arm structure has a terminal group selected from .H, .OH, .R, .C(=O)OR, .C(=O)NR$_2$, .C(=O)NHR, .C(=O)NH$_2$, .OC(=O)R, .C(=O)R, .OR, and .X,
wherein R comprises an optionally substituted alkyl, cyclic, cycloalkyl, or aromatic group of one to twelve carbons, and X is selected from fluorine, chlorine, bromine, iodine, or combinations of these;
that the number of arms ranges from four to twenty-four;
that the number average molecular weight of each arm attached to the core of the core-link-arm structure ranges from 800 to 6000; or
that each arm attached to the core of the core-link-arm structure is a polyether, and preferably polyethylene oxide.

EXAMPLES

The following examples further illustrate the compositions, articles and methods described herein.
Materials
Polyoxymethylene ["POM"] Polymers POM polymers used in these examples are available from E.I. du Pont de Nemours and Company, Inc, Delaware; Polyplastics, Co., LTD., Japan; and BASF, SE, Germany.

POM-B is POM homopolymer available from E.I. du Pont de Nemours and Company, Inc, Delaware. POM-B has acetate end groups; polymer melt mass-flow rate of 2.3 grams/(10 minutes) when tested using ASTM D1238-04C, carried out at Condition 190° C./2.16 kg, and impact strength of 120 J/m at 23° C., when tested using ASTM D 256-06a "Standard Test Methods for Determining the Izod Pendulum Impact Resistance of Plastics".

POM-GC is a polyoxymethylene copolymer of lower molecular weight than POM-B, available from Ticona, Germany. Polymer melt mass-flow rate of 9 grams/10 minutes when tested using ASTM D1238-04C, carried out at Condition 190° C./2.16 kg.

POM-C is a polyoxymethylene homopolymer of higher molecular weight than POM-B, available from E.I. du Pont de Nemours and Company, Delaware. POM-C has acetate end groups; and a polymer melt mass-flow rate of 0.4 g/10 minutes when tested using ASTM D1238-04C, carried out at Condition 190/2.16.

POM-D is a nucleated POM homopolymer having a very low molecular weight, available from E.I. du Pont de Nemours and Company, Delaware, as Delrin® 511P. POM-D has acetate end groups; and a polymer melt mass-flow rate of 15 g/10 minutes when tested using ASTM D1238-04C, carried out at Condition 190/2.16.
Core-Link-Arm Polymers The core-link-arm polymers used in the Examples have polyethylene oxide arms with a single repeating unit of .CH$_2$CH$_2$O. and end with —OCH$_2$CH$_2$OH (e.g. .OH or .H terminal group).

SP8-02K designates an eight arm core-link-arm polymer with CAS Registry Number [91372-14-4] and molecular weight of about 2000, represented in part by the structures of FIG. 1, obtained from NOF America Corporation, NY. Similarly, SP8-10K is an eight arm core-link-arm polymer having the same structure as SP8-02K, but with molecular weight of about 10,000. SP8-40K is an eight arm core-link-arm polymer having the same structure as SP8-02K, but with molecular weight of about 40,000.

SP6-10K designates a six arm core-link-arm polymer with CAS Registry Number [53694-15-8] and molecular weight of about 10 000, analogous to the structure of FIG. 3, obtained from SunBioUSA, Inc, CA.

SP4-02K designates a four arm core-link-arm polymer with CAS Registry Number [30599-15-6] and molecular weight of about 2 000, analogous to the structure of FIG. 2, obtained from NOF America Corporation, NY. Similarly, SP4-10K has the same structure as SP4-02K, but with molecular weight of about 10,000.

SP6-15K designates a six arm core-link-arm polymer with CAS Registry Number [53694-15-8] and molecular weight of about 15,000, obtained from SunBioUSA Inc, CA.

SP6-20K designates a six arm core-link-arm polymer with CAS Registry Number [53694-15-8] and molecular weight of about 20,000 obtained from SunBioUSA Inc, CA SP8-15K designates an eight arm core-link-arm polymer with CAS Registry Number [91372-14-4] and molecular weight of about 15,000, represented in part by the structures of FIG. 1.

The following table summarizes characteristics of some core-link-arm polymers.

TABLE 1

Core-Link-Arm [CLA] Polymer Characteristics.

| CLA Polymer | Number of Radicals in Multiradical Core | Core Structure | Repeating Units of Arm | Terminal Group(s) of Arm | Core Mass | Average Molecular Weight of Arm | Mass Ratio of Arms to Core |
|---|---|---|---|---|---|---|---|
| SP4-02K | 4 | PE | •CH$_2$CH$_2$O• | •H | 132 | 467 | 14.2 |
| SP4-10K | 4 | PE | •CH$_2$CH$_2$O• | •H | 132 | 2467 | 74.8 |
| SP6-10K | 6 | SO | •CH$_2$CH$_2$O• | •H | 176 | 1637 | 55.8 |
| SP6-15K | 6 | SO | •CH$_2$CH$_2$O• | •H | 176 | 2471 | 84.2 |
| SP6-20K | 6 | SO | •CH$_2$CH$_2$O• | •H | 176 | 3304 | 112.6 |
| SP8-02K | 8 (average) | HG | •CH$_2$CH$_2$O• | •H | 454 (average) | 193 | 3.4 |

TABLE 1-continued

Core-Link-Arm [CLA] Polymer Characteristics.

| CLA Polymer | Number of Radicals in Multiradical Core | Core Structure | Repeating Units of Arm | Terminal Group(s) of Arm | Core Mass | Average Molecular Weight of Arm | Mass Ratio of Arms to Core |
|---|---|---|---|---|---|---|---|
| SP8-10K | 8 (average) | HG | •$CH_2CH_2O$• | •H | 454 (average) | 1193 | 21.0 |
| SPS-15K | 8 (average) | HG | •$CH_2CH_2O$• | •H | 454 (average) | 1818 | 32.0 |
| SP8-40K | 8 (average) | HG | •$CH_2CH_2O$• | •H | 454 (average) | 4943 | 87.1 |

PE = •$OCH_2C(CH_2O•)_3$
SO = •$OCH_2CH(O•)CH(O•)CH(O•)CH(O•)CH_2O$•
HG = hexaglycerol-like (thought to be mixture of multiradical cores averaging to 8 radicals per core; each core comprising repeating units such as in FIG. 1)

Arm Free Hyperbranched Polymers

B-H40 designates a branched macromolecule often termed dendritic, with only a core based upon an alkyl polyol polymerized by condensation with 2,2-dimethylol propionic acid—no linear polymer arms are present. Available from Perstorp AB, Sweden, B-H40 is characterized as having a molecular weight of about 7 300 and approximately 64 terminal hydroxyl groups. B-H40 was further purified by dissolving it nearly completely in a solvent and then filtering the mixture through neutral alumina and precipitating the solution in a non-solvent to provide B-H40fp.

Linear Polyethylene Oxides

The following linear polyethylene glycols (PEG) were used in the examples:
PEG-550=polyethylene glycol monomethyl ether of typical Mn 550, obtained from Sigma-Aldrich Inc., Atlanta, Ga.;
PEG-1000=polyethylene glycol monomethyl ether 1000, catalog number 17738, obtained from the Fluka division of Sigma-Aldrich Inc.;
PEG-2000=polyethylene glycol of average Mn 1,900-2,200, obtained from Sigma-Aldrich Inc.;
PEG-4600=polyethylene glycol of average Mn 4,400-4,800, obtained from Sigma-Aldrich Inc.;
PEG-6000=polyethylene glycol of average Mn 5,000-7,000, obtained from Sigma-Aldrich Inc.;
PEG-8000=polyethylene glycol of average Mn 8000, obtained from Sigma-Aldrich Inc.;
PEG-8700=polyethylene glycol of molecular weight of about 6000, obtained from Kao Specialties Americas LLC, High Point, N.C.

Fillers and Additives

Nypol-6B [25191-96-6], a polyamide thermal stabilizer, is a terpolymer of polyamide 6-6/6-10/6 with a melting point of 160 C, obtained from E.I. du Pont de Nemours and Company, Inc, Delaware.

MAP-1070 is 80% polyacrylamide with CAS Registry Number [9003-05-8], coated with 20% polyethylene glycol.

Compositions

Compositions optionally included as additives 1 weight percent Nypol-6B, 1 weight percent MAP-1070, a core-link-arm polymer as described herein, and the remaining weight percent of a polyoxymethylene polymer described herein. A dry blend of such ingredients was fed through a twin screw extruder at 180 to 200° C. to produce pellets. Pellets were used to manufacture articles for testing. Compositions are given designations such as E1 (e.g. first example composition) and shown in table 2 and table 3 with results of tests.

Apparatus

The extruder used in these examples is a Prism 16 mm twin-screw extruder manufactured by Welding Engineers, Inc. USA. Also used in these examples is a Capillary Rheometer Kayeness Galaxy V, from Dynisco Instruments, MA, USA.

Methods

Molded samples were made as follows: Pellets were made from a dry mixture of 1 weight percent each of the polyamide and polyacrylamide stabilizer (additives) and the amount of added polymer shown in Table 2 and the remaining weight percent to 100 percent of polyoxymethylene polymer.

The dry mixture was fed into a twin-screw extruder fitted with a 0.125" die; three temperature zones were maintained at 180-200° C. Screw design was chosen to have separate melting and mixing zones and pellets of the blend were extruded at 75 rpm. Resulting pellets were dried for 4 hrs at 80° C. under vacuum, prior to molding.

The pellets were promptly molded into ASTM D638 type I specimens in an injection molding apparatus with a barrel at 200-210° C. and mold temperature of 90° C.

Rheology of the compositions was measured using a Capillary Rheometer at 220 C, using a 0.762 mm diameter, 15.24 mm long die operating in two different modes. In one mode, the piston velocity driving flow through the capillary was varied during the measurement to yield apparent capillary melt viscosity as a function of shear rate. In the alternate mode, constant piston velocity (and hence shear rate) measurements were made as a function of residence time in the rheometer barrel to determine melt viscosity stability over time.

Tests

Melt viscosity stability was calculated using a least squares fit to the four data points measured at the indicated shear rate and the indicated times according to ASTM D3835-08. Apparent capillary melt viscosity was measured according to the methods of ASTM D3835-08. Flow length was measured according to the Flow Length Test Conditions described herein. Tensile strength, elongation at break, and tensile modulus were measured according to ASTM D638 at a speed of testing of 50 mm per minute. The notched Izod impact strength was measured according to ASTM D256-D6a, Method A.

TABLE 2a

| Designation | | E1 | E2 | E3 | E4 | E5 | E6 | C1 | C2 |
|---|---|---|---|---|---|---|---|---|---|
| Polyoxymethylene Polymer | | POM-B | POM-B | POM-B | POM-B | POM-B | POM-B | POM-B | POM-GC |
| Added polymer | | SP4-02K | SP4-10K | SP6-10K | SP8-02K | SP8-10K | SP8-40K | | |
| Wt % Added on Total | | 2 | 2 | 2 | 2 | 2 | 2 | | |
| Additives Wt % on Total | | 2 | 2 | 2 | 2 | 2 | 2 | 2 | 2 |
| Apparent | [55 s$^{-1}$] | 2128 | 777 | 646 | 2054 | 701 | 1204 | 2196 | 686 |
| Capillary Melt | [110 s$^{-1}$] | 1651 | 761 | 599 | 1478 | 654 | 984 | 1717 | 617 |
| Viscosity | [495 s$^{-1}$] | 723 | 526 | 471 | 701 | 509 | 518 | 754 | 371 |
| (ACMV) | [990 s$^{-1}$] | 470 | 396 | 354 | 466 | 394 | 360 | 490 | 262 |
| at 220° C. | [5003 s$^{-1}$] | 146 | 131 | 131 | 144 | 131 | 134 | 150 | 92 |
| [shear rate] (Pa·s) | | | | | | | | | |
| Relative Apparent Capillary Melt Viscosity $^b$ (ACMV) [55 s$^{-1}$] | | 0.969 | 0.354 | 0.294 | 0.936 | 0.319 | 0.549 | 1.000 | 1.000 |
| Relative ACMV Improvement [55 s$^{-1}$] As % Decreased | | 3 | 65 | 71 | 6 | 68 | 45 | | |
| Apparent | [5.9 min] | 1564 | 872 | 590 | 1452 | 668 | 1015 | 1657 | 613 |
| Capillary Melt | [9.0 min] | 1545 | 892 | 553 | 1508 | 639 | 1002 | 1677 | 616 |
| Viscosity | [12.2 min] | 1569 | 921 | 508 | 1526 | 667 | 1008 | 1711 | 598 |
| (ACMV) | [15.4 min] | 1603 | 943 | 509 | 1512 | 695 | 1030 | 1726 | 604 |
| 220° C. & 100 s$^{-1}$ | [18.6 min] | 1644 | 968 | 514 | 1633 | 671 | 1050 | 1739 | 595 |
| (Pa·s) | | | | | | | | | |
| Melt-Viscosity Stability $^a$ (×1000) | | 1.86 | 3.61 | −4.87 | 3.23 | 1.28 | 1.31 | 1.71 | −1.06 |
| Percent Standard Error | | 31% | 3% | 35% | 32% | 100% | 42% | 11% | 38% |

$^a$ Melt-Viscosity Stability is from a plot of [log(Pa·s)/min] (×1000) (e.g. 1.86 => slope of 1.86 × 10$^{-3}$)
$^b$ Relative Apparent Capillary Melt Viscosity = Apparent Capillary Melt Viscosity [ACMV] of an Example at 55 s$^{-1}$ divided by ACMV of Relevant Comparative Example at 55 s$^{-1}$ TABLE 2b

| Designation | | C1 | C2 | B1 | B2 | B3 | B4 | B5 | B6 | B7 |
|---|---|---|---|---|---|---|---|---|---|---|
| Polyoxymethylene Polymer | | POM-B | POM-GC | POM-B | POM-B | POM-GC | POM-GC | POM-B | POM-GC | POM-GC |
| Added polymer | | | | B-H40fp | B-H40fp | B-H40fp | B-H40fp | B-H40 | B-H40 | B-H40 |
| Wt % Added on Total | | | | 0.5 | 2 | 0.5 | 2 | 2 | 0.5 | 2 |
| Additives Wt % on Total | | 2 | 2 | 2 | 2 | 2 | 2 | 2 | 2 | 2 |
| Apparent | [55 s$^{-1}$] | 2196 | 686 | 1990 | 523 | 457 | 413 | 11 | 975 | 8 |
| Capillary Melt | [110 s$^{-1}$] | 1717 | 617 | 1617 | 250 | 424 | 401 | 125 | 909 | 82 |
| Viscosity | [495 v] | 754 | 371 | 768 | 158 | 280 | 272 | 19 | 531 | 31 |
| (ACMV) | [990 s$^{-1}$] | 490 | 262 | 485 | 138 | 213 | 202 | 11 | 368 | 15 |
| at 220° C. | [5003 s$^{-1}$] | 150 | 92 | 146 | 64 | 83 | 77 | 3 | 118 | 2 |
| [shear rate] (Pa·s) | | | | | | | | | | |
| Relative ACMV$^b$ [55 s$^{-1}$] | | 1.000 | 1.000 | 0.907 | 0.238 | 0.666 | 0.603 | 0.016 | 1.422 | 0.012 |
| Relative ACMV Improvement [55 s$^{-1}$] as % Decreased | | | | 9 | 76 | 33 | 40 | 98 | (42) Increase | 99 |
| Apparent | [5.9 min] | 1657 | 613 | 1607 | | 612 | 605 | | 1123 | |
| Capillary Melt | [9.0 min] | 1677 | 616 | 1564 | | 634 | 558 | | 768 | |
| Viscosity | [12.2 min] | 1711 | 598 | 1497 | | 633 | 471 | | 595 | |
| (ACMV) | [15.4 min] | 1726 | 604 | 1441 | | 623 | 369 | | 448 | |
| 220° C. & 100 s$^{-1}$ | [18.6 min] | 1739 | 595 | 1387 | | 633 | 267 | | 381 | |
| (Pa·s) | | | | | | | | | | |
| Melt-Viscosity Stability$^a$ | | 1.71 | −1.06 | −5.14 | | 0.66 | −28.05 | | −36.82 | |
| Percent Standard Error | | 11% | 38% | 3% | | 99% | 13% | | 8% | |

$^a$Melt-Viscosity Stability is from a plot of [log(Pa·s)/min] (×1000) (e.g. 1.86 => slope of 1.86 × 10$^{-3}$)
$^b$Relative ACMV = the ACMV of a "B" Composition at 55 s$^{-1}$ divided by the ACMV of the Relevant Comparative Example at 55 s$^{-1}$ TABLE 2c

| Designation | | C1 | C2 | L1 | L2 | L3 | L4 | L5 | L6 | L7 |
|---|---|---|---|---|---|---|---|---|---|---|
| Polyoxymethylene Polymer | | POM-B | POM-GC | POM-B | POM-B | POM-B | POM-B | POM-B | POM-B | POM-B |
| Added polymer | | | | PEG-550 | PEG-1000 | PEG-2000 | PEG-4600 | PEG-6000 | PEG-8000 | PEG-8700 |
| Wt % Added on Total | | | | 2 | 2 | 2 | 2 | 2 | 2 | 2 |
| Additives Wt % on Total | | 2 | 2 | 2 | 2 | 2 | 2 | 2 | 2 | 2 |
| Apparent | [55 s s$^{-1}$] | 2196 | 686 | 2096 | 2031 | 1721 | 1891 | 1754 | 1407 | 1580 |
| Capillary Melt | [110 s s$^{-1}$] | 1717 | 617 | 1598 | 1536 | 1355 | 1429 | 1371 | 1233 | 1322 |
| Viscosity | [495 s s$^{-1}$] | 754 | 371 | 701 | 684 | 624 | 666 | 655 | 647 | 686 |
| (ACMV) | [990 s s$^{-1}$] | 490 | 262 | 461 | 450 | 417 | 438 | 431 | 430 | 458 |
| 220° C. | [5003 s s$^{-1}$] | 150 | 92 | 148 | 142 | 137 | 137 | 142 | 137 | 144 |
| [shear rate] (Pa·s) | | | | | | | | | | |
| Relative ACMV$^b$ [55 s$^{-1}$] | | 1.000 | 1.000 | 0.955 | 0.925 | 0.784 | 0.861 | 0.799 | 0.641 | 0.720 |
| Relative ACMV Improvement [55 s$^{-1}$] as % Decreased | | | | 4 | 7 | 22 | 14 | 20 | 36 | 28 |

TABLE 2c-continued

| Designation | | C1 | C2 | L1 | L2 | L3 | L4 | L5 | L6 | L7 |
|---|---|---|---|---|---|---|---|---|---|---|
| Apparent | [5.9 min] | 1657 | 613 | 1551 | 1531 | 1430 | 1434 | 1371 | 1135 | 1119 |
| Capillary Melt | [9.0 min] | 1677 | 616 | 1521 | 1540 | 1450 | 1454 | 1394 | 1194 | 1138 |
| Viscosity | [12.2 min] | 1711 | 598 | 1615 | 1545 | 1443 | 1465 | 1400 | 1335 | 1174 |
| (ACMV) | [15.4 min] | 1726 | 604 | 1622 | 1560 | 1445 | 1471 | 1405 | 1328 | 1129 |
| 220° C. & 100 s$^{-1}$ | [18.6 min] | 1739 | 595 | 1668 | 1535 | 1402 | 1485 | 1422 | 1260 | 1175 |
| (Pa · s) | | | | | | | | | | |
| Melt-Viscosity Stability[a] | | | 1.71 | −1.06 | 2.86 | 0.24 | −0.60 | 1.10 | 1.11 | 4.27 | 1.21 |
| Percent Standard Error | | | 11% | 38% | 29% | 140% | 96% | 11% | 16% | 57% | 72% |

[a]Melt-Viscosity Stability is from a plot of [log(Pa · s)/min] (×1000) (e.g. 1.86 => slope of 1.86 × 10$^{-3}$)
[b]Relative ACMV = the ACMV of an "L" Composition at 55 s$^{-1}$ divided by the ACMV of the Relevant Comparative Example at 55 s$^{-1}$ TABLE 2d

| Designation | | C1 | E7 | E8 | E9 |
|---|---|---|---|---|---|
| POM polymer | | POM-B | POM-B | POM-B | POM-B |
| Added polymer | | | SP6-15K | SP6-20K | SP8-15K |
| Wt % added on total | | 0 | 2 | 2 | 2 |
| Additives wt % on total | | 2 | 2 | 2 | 2 |
| Apparent | [55 s$^{-1}$] | 2196 | 798.3 | 816 | 1127 |
| Capillary Melt | [110 s$^{-1}$] | 1717 | 728.45 | 840 | 958.6 |
| Viscosity | [495 s$^{-1}$] | 754 | 440.5 | 443 | 633.05 |
| (ACMV) | [990 s$^{-1}$] | 490 | 322.8 | 330 | 437.15 |
| at 220° C. | [5003 s$^{-1}$] | 150 | 129.5 | 133 | 130.85 |
| [shear rate] | | | | | |
| (Pa · s) | | | | | |
| Relative ACMV[b] [55 s−1] | | 1.000 | 0.364 | 0.372 | 0.513 |
| Relative ACMV Improvement [55 s$^{-1}$] | | | 64 | 63 | 49 |
| as % Decreased | | | | | |
| Apparent | [5.9 min] | 1657 | 633.8 | | 839.2 |
| Capillary Melt | [9.0 min] | 1677 | 637 | | 933.2 |
| Viscosity | [12.2 min] | 1711 | 613.1 | | 949.1 |
| (ACMV) | [15.4 min] | 1726 | 621.1 | | 936.4 |
| 220° C. and 100 s$^{-1}$ | [18.6 min] | 1739 | 621.1 | | 925.2 |
| (Pa · s) | | | | | |
| Melt-Viscosity Stability[a] | | 1.71 | −0.90 | | 2.69 |
| Percent Standard Error | | 11% | | | |

[a]Melt-Viscosity Stability is from a plot of [log(Pa · s)/min] (×1000) (e.g. 1.86 => slope of 1.86 × 10$^{-3}$)
[b]Relative Apparent Capillary Melt Viscosity = the ACMV of an Example Composition at 55 s$^{-1}$ divided by the ACMV of the Relevant Comparative Example at 55 s$^{-1}$ TABLE 2e

| Designation | | C1 | E10 | E11 | E12 | E13 | E14 |
|---|---|---|---|---|---|---|---|
| POM polymer | | POM-B | POM-B | POM-B | POM-B | POM-B | POM-B |
| Added polymer | | | SP6-15K | SP6-15K | SP6-15K | SP6-15K | SP6-15K |
| Wt % added on total | | | 0.5 | 1 | 2 | 5 | 10 |
| Additives wt % on total | | 2 | 2 | 2 | 2 | 2 | 2 |
| Apparent | [55 s$^{-1}$] | 2196 | 1146 | 1101 | 805 | 386 | 243 |
| Capillary | [110 s$^{-1}$] | 1717 | 1056 | 1059 | 730 | 347 | 204 |
| Melt Viscosity | [495 s$^{-1}$] | 754 | 655 | 677 | 443 | 189 | 87 |
| (ACMV) | [990 s$^{-1}$] | 490 | 425 | 451 | 322 | 150 | 56 |
| at 220° C. | [5003 s$^{-1}$] | 150 | 136 | 143 | 127 | 56 | 33 |
| [shear rate] | | | | | | | |
| (Pa · s) | | | | | | | |
| Relative ACMV[b] [55 s$^{-1}$] | | 1.000 | 0.522 | 0.502 | 0.366 | 0.176 | 0.111 |
| Relative ACMV Improvement [55 s$^{-1}$] | | | 48 | 50 | 63 | 82 | 89 |
| as % Decreased | | | | | | | |
| Apparent | [5.9 min] | 1657 | 900 | 956 | 658 | 298 | 215 |
| Capillary Melt | [9.0 min] | 1677 | 944 | 914 | 655 | 307 | 194 |
| Viscosity | [12.2 min] | 1711 | 906 | 922 | 607 | 284 | 186 |
| (ACMV) | [15.4 min] | 1726 | 959 | 954 | 605 | 271 | 177 |
| 220° C. and 100 s$^{-1}$ | [18.6 min] | 1739 | 1013 | 1073 | 596 | 268 | 162 |
| (Pa · s) | | | | | | | |
| Melt-Viscosity Stability[a] | | 1.71 | 3.4 | 3.8 | −3.8 | −4.7 | −8.9 |
| Percent Standard Error | | 11% | 39% | 62% | 24% | 27% | 9% |

[a]Melt-Viscosity Stability is from a plot of [log(Pa · s)/min] (×1000) (e.g. 1.86 => slope of 1.86 × 10$^{-3}$)
[b]Relative ACMV = the ACMV of an Exemple Composition at 55 s$^{-1}$ divided by the ACMV of the Relevant Comparative Example at 55 s$^{-1}$ TABLE 2f

| Designation | | E15 | C3 | E16 | C4 |
|---|---|---|---|---|---|
| POM polymer | | POM-C | POM-C | POM-D | POM-D |
| Added polymer | | SP6-10K | | SP6-15K | |
| Wt % added on total | | 2 | 0 | 2 | 0 |
| Additives wt % on total | | 2 | 2 | 0 | 0 |
| Apparent | [55 s$^{-1}$] | 2211 | 3587 | 222 | 461 |
| Capillary Melt | [110 s$^{-1}$] | 1854 | 2533 | 211 | 425 |
| Viscosity | [495 s$^{-1}$] | 947 | 970 | 138 | 287 |
| (ACMV) | [990 s$^{-1}$] | 565 | 613 | 116 | 211 |
| at 220° C. | [5003 s$^{-1}$] | 145 | 146 | 53 | 84 |
| [shear rate] (Pa · s) | | | | | |
| Relative ACMV$^b$ [55 s$^{-1}$] | | 0.616 | 1.000 | 0.481 | 1.000 |
| Relative ACMV Improvement [55 s$^{-1}$] as % Decreased | | 38 | | 52 | |
| Apparent | [5.9 min] | 1302 | 2282 | 192 | 420 |
| Capillary Melt | [9.0 min] | 1566 | 2390 | 192 | 428 |
| Viscosity | [12.2 min] | 1710 | 2487 | 173 | 428 |
| (ACMV) | [15.4 min] | 1797 | 2562 | 180 | 430 |
| 220° C. and 100 s$^{-1}$ | [18.6 min] | 1820 | 2683 | 182 | 433 |
| (Pa · s) | | | | | |
| Melt-Viscosity stability$^a$ | | 11 | 5 | −2.2 | 0.9 |
| Percent Standard Error | | 24% | 4% | 81% | 27% |

$^a$Melt-Viscosity Stability is from a plot of [log(Pa · s)/min] (×1000) (e.g. 1.86 => slope of 1.86 × 10$^{-3}$)
$^b$Relative ACMV = the ACMV of an Exemple Composition at 55 s$^{-1}$ divided by the ACMV of the Relevant Comparative Example at 55 s$^{-1}$

TABLE 3

| Designation | E2 | E3 | E5 | E6 | C1 | L2 | L4 | L7 | E16 | C4 |
|---|---|---|---|---|---|---|---|---|---|---|
| Polyoxymethylene Polymer | POM-B | POM-B | POM-B | POM-B | POM-B | POM-B | POM-B | POM-B | POM-D | POM-D |
| Added polymer | SP4-10K | SP6-10K | SP8-10K | SP8-40K | | PEG-1000 | PEG-4600 | PEG-8700 | SP6-15K | |
| Wt % Added on Total | 2 | 2 | 2 | 2 | | 2 | 2 | 2 | 2 | 0 |
| Additives Wt % on Total | 2 | 2 | 2 | 2 | 2 | 2 | 2 | 2 | 2 | 2 |
| Flow Length (mm @ 90 Mpa) | 171 | 183 | 180 | 185 | 157 | 177 | 174 | 176 | 370 | 330 |
| Flow Length Ratio$^c$ | 1.09 | 1.17 | 1.15 | 1.18 | 1.00 | 1.13 | 1.11 | 1.12 | 1.12 | 1.00 |
| Tensile Strength (Mpa) | 68 | 68 | 68 | 67 | 71 | 68 | 68 | 67 | 68 | 76 |
| Tensile Strength Ratio$^c$ | 0.96 | 0.95 | 0.95 | 0.94 | 1.00 | 0.96 | 0.95 | 0.94 | 0.89 | 1.00 |
| Elongation at Break (%) | 54.2 | 45.2 | 44.5 | 48.2 | 42.4 | 38.7 | 39.1 | 40.6 | 32 | 20 |
| Elongation at Break Ratio$^c$ | 1.28 | 1.07 | 1.051 | 1.14 | 1.00 | 0.91 | 0.92 | 0.96 | 1.6 | 1.0 |
| Tensile Modulus (Mpa) | 3129 | 3102 | 2767 | 2907 | 3261 | 2819 | 2986 | 2899 | 3220 | 3450 |
| Tensile Modulus Ratio$^c$ | 0.96 | 0.95 | 0.85 | 0.89 | 1.00 | 0.86 | 0.92 | 0.89 | 0.93 | 1.00 |
| Notched Izod Impact Strength (J/m) | 100 | 65 | 96 | 100 | 81 | 95 | 87 | 81 | 6.8 | 6.6 |
| Izod Strength Ratio$^c$ | 1.24 | 0.81 | 1.19 | 1.24 | 1.00 | 1.17 | 1.07 | 1.00 | 1.03 | 1.00 |

$^c$This ratio is determined by dividing the relevant value for the POM composition comprising the core-link-arm polymer by the relevant value of a composition consisting of the same POM polymer and the same additives and fillers, measured under the same conditions.

Discussion of Results: FIGS. 4 to 7

Figure 4A:
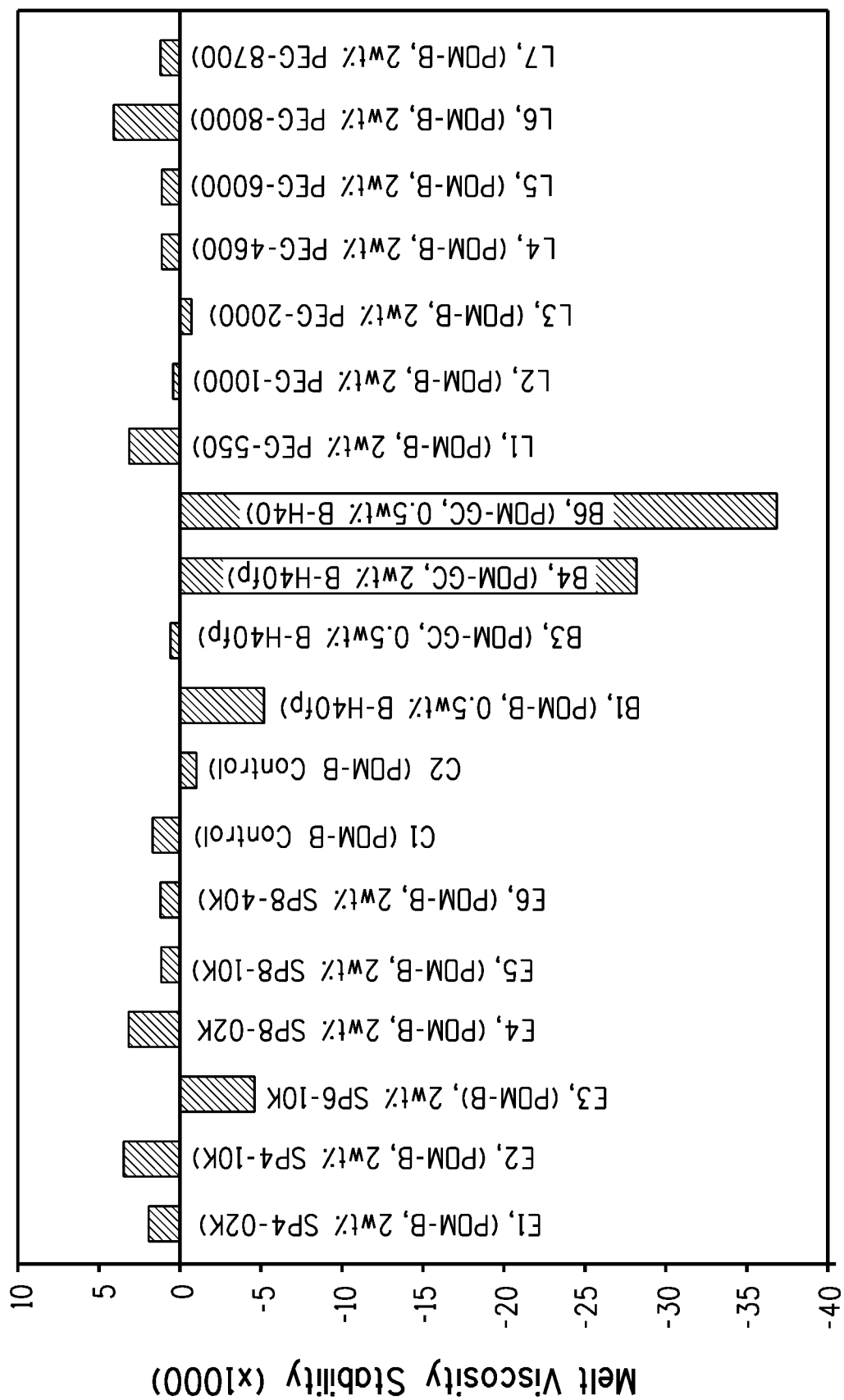
FIGS. 4A and B illustrate melt viscosity stability of exemplary compositions.
Figure 4B:
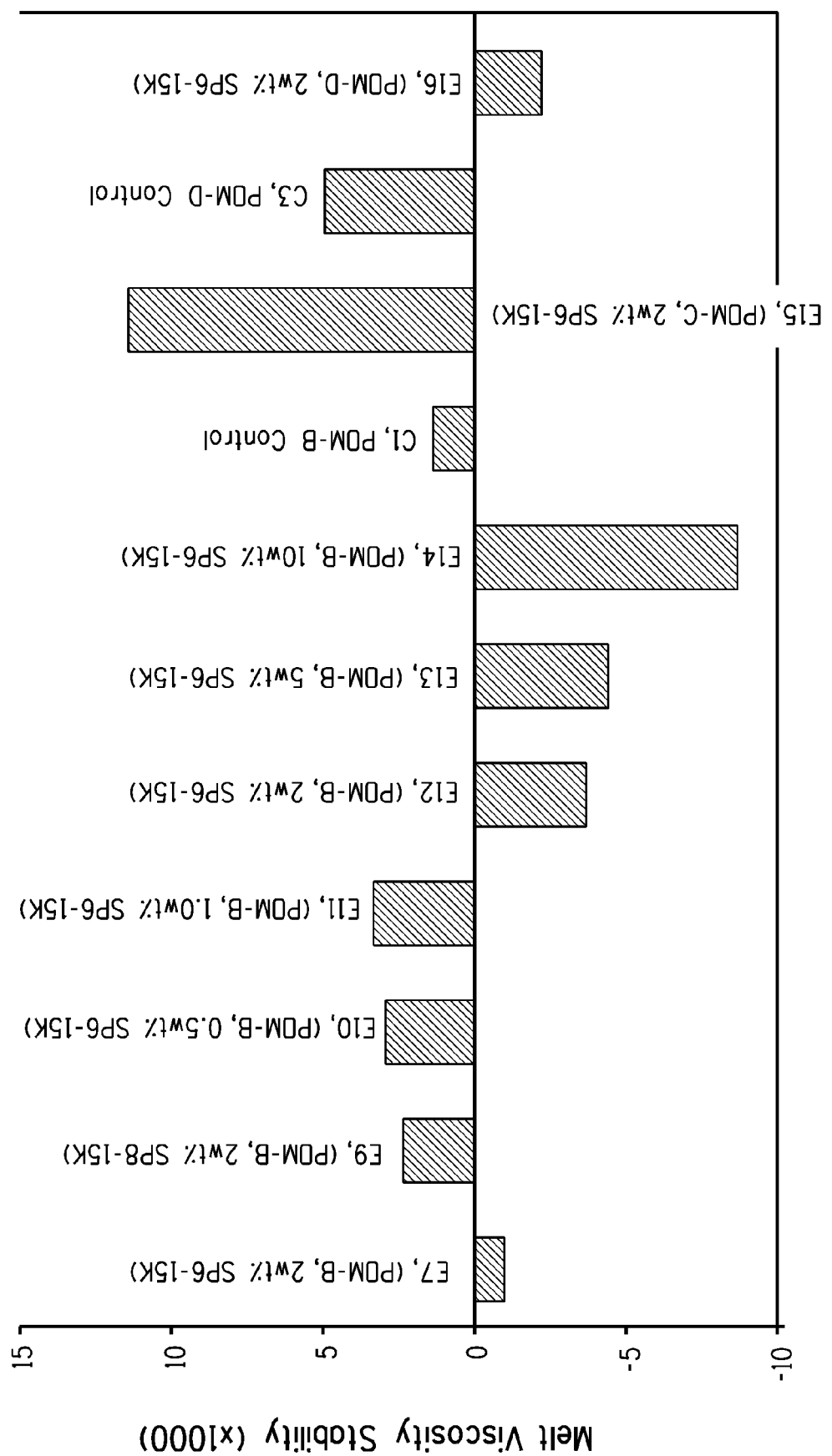
Figure 5A:
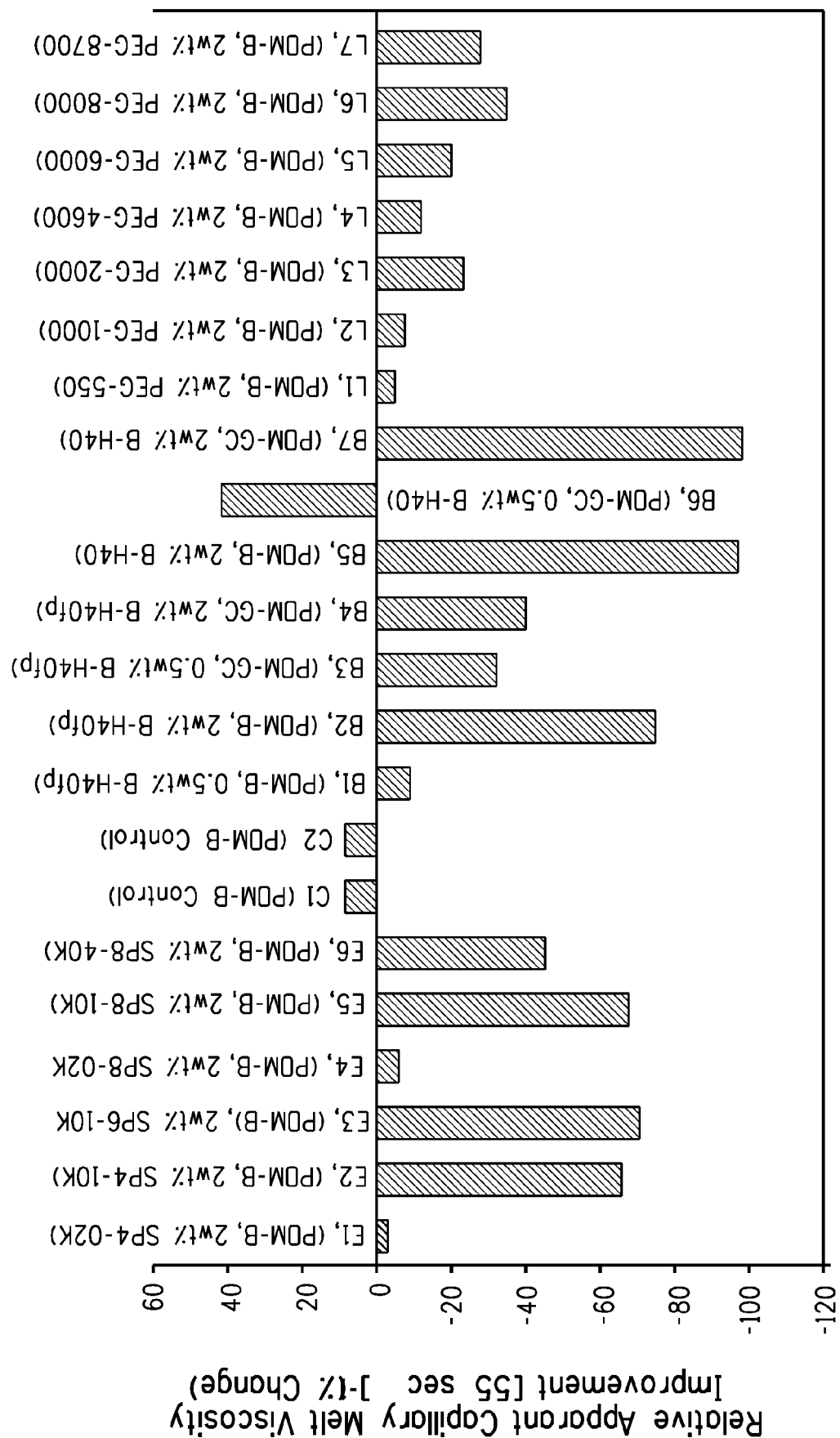
FIGS. 5A and B illustrate improvement of relative apparent capillary melt viscosity at 55 $s^{-1}$ shear rate of exemplary compositions.
Figure 5B:
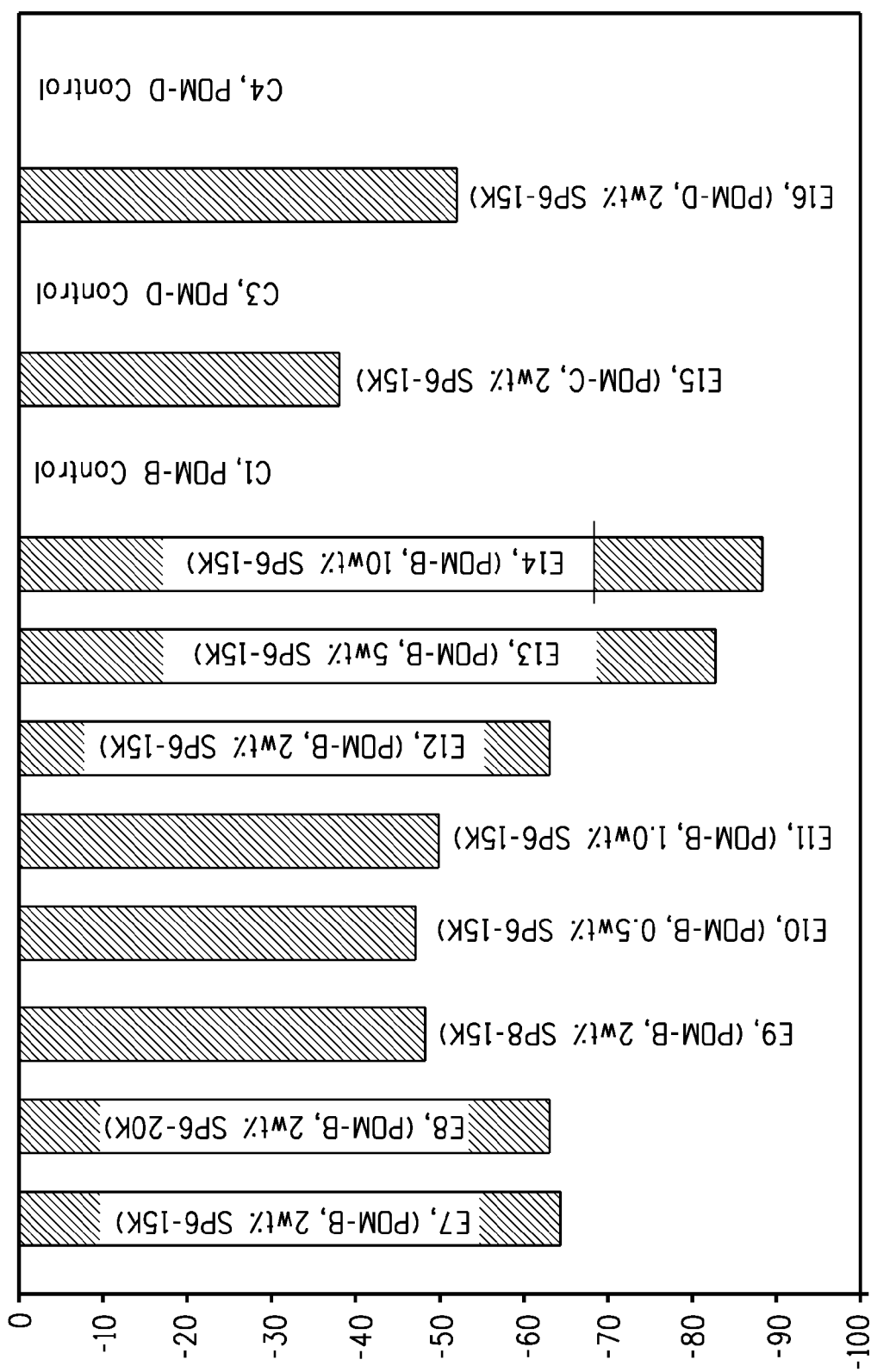
Figure 6:
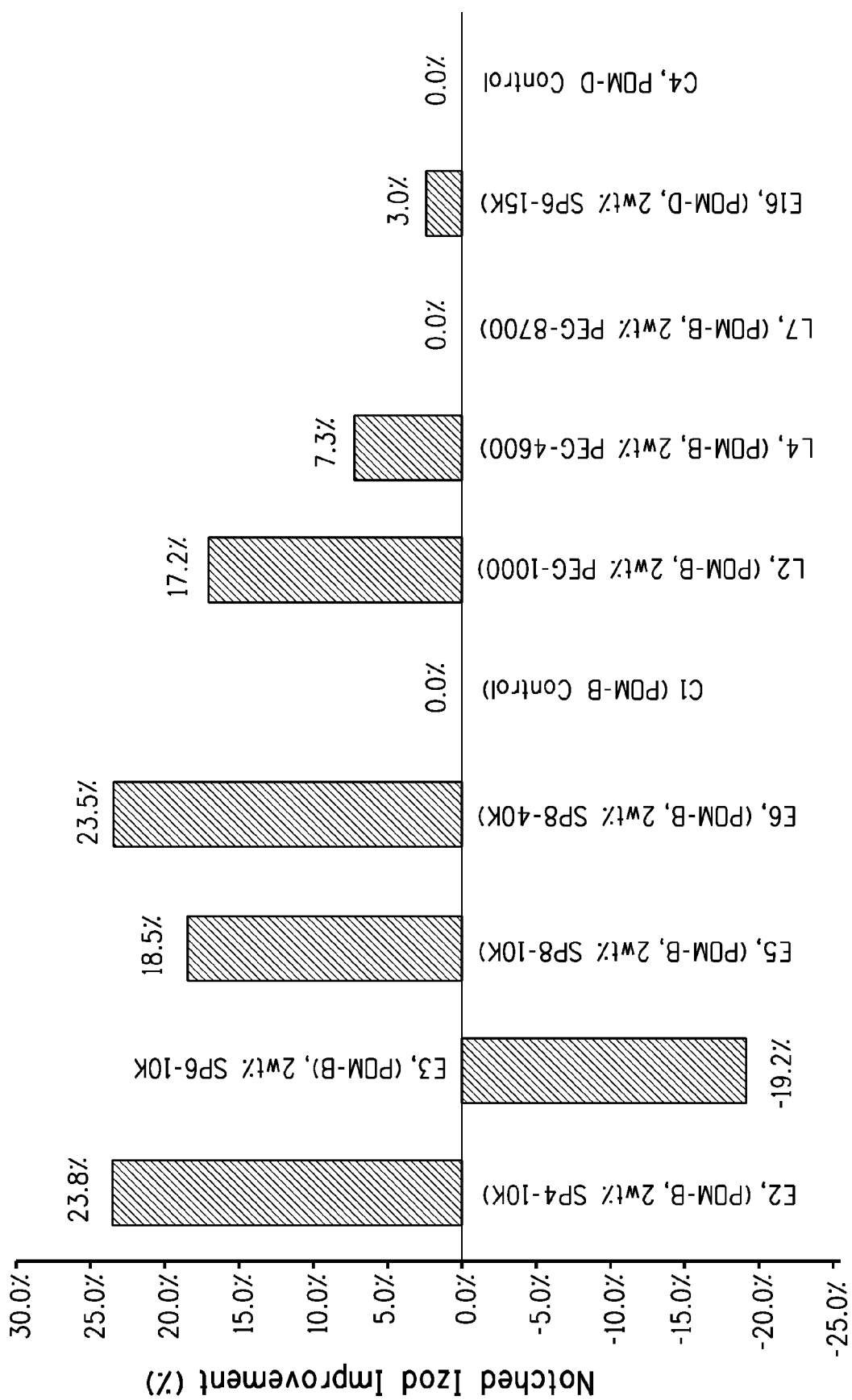
FIG. 6 illustrates improvement in notched Izod pendulum impact resistance [shortened to "notched Izod"] of exemplary compositions.

In the Tables and in FIGS. 4 to 7, "C", "L" and "B" denote various comparative examples: "C" denotes examples with POMs lacking CLA polymers described herein; "L" denotes examples with linear polyethylene glycol; and "B" denotes examples using Boltorn® branched or dendritic polymers. FIGS. 4 and 6

FIGS. 4 (A and B) and 6 collectively support the recited process of: obtaining melt viscosity stability while simultaneously increasing notched Izod by the addition to POM polymers of the core-link-arm polymers described herein. Specifically, FIGS. 4A and B show bar charts of melt viscosity stability (S) of certain polyoxymethylene compositions reported in Table 2. Exemplary POM compositions are reported in Tables 2a, 2d, 2e, and 2f; Comparative examples of POM compositions are reported in Tables 2a through f; other POM compositions are reported in Tables 2b and c.

The melt viscosity stability has been determined from measurements of viscosity at the cited intervals, using the methods of ASTM D3835-08, X1.4 at 220° C. and 100 s$^{-1}$ shear rate. Comparative sample C1 without core-link-arm polymer had a small positive value of S, indicating acceptable stability. In general, when S is at or very near 0, the melt viscosity of the molten composition (determined experimentally) remains relatively constant for the duration of the test period. When S is greater than zero, the viscosity tends to increase with time. When S is negative, the viscosity tends to decrease with time. A large negative S points to melt viscosity instability, which is generally undesirable as that may be signaling breakdown in molecular weight of the polymer, particularly the POM. Correspondingly, a large positive S value may be signaling cross linking or branching reactions that increase molecular weight of the components of the composition. Therefore, an S value close to 0 indicates a stable melt viscosity and no need to change molding conditions.

FIG. 6 depicts increase in notched Izod of the POM compositions of Table 3. The notched Izod impact strength has been determined by the method of ASTM D256-D6a. Generally, FIG. 6 conveys that POM compositions molded into Type I specimens that exhibit an increase of notched Izod impact strength will translate into tougher articles having increased notched Izod. Specifically, when POM compositions described herein exhibit at least a 10% increase in notched Izod impact strength over the notched Izod impact strength of polyoxymethylene compositions lacking core-link-arm polymers means that these POM compositions result in stronger articles than POM compositions lacking CLA polymers.

Referring now to FIGS. 4A and B, melt viscosity stability ["S"] values were obtained for Examples E1 through E7, E9, E10 through E16 and are reported in Tables 2a, d, e and f. The melt viscosity stability ["S"] values for E1, E2, E4 through E6 and E9 through E12 fell within the recited range of S values in the claims, namely, −0.005 and +0.005, and were positive. The S values for E3, E7, E12, E13, and E16 also fell within the recited range but were negative. Therefore, E1 through E1and E9 through E13 and E16 exhibited S values in the recited range and possessed a stable melt viscosity.

The S value for E8 was not obtained. For E14 and E15, the S values for E14 and E15 fell outside the recited range of −0.005 and +0.005. Therefore, E8, E14 and E15 did not exhibit a stable melt viscosity as defined by the recited range and do not support the recited process of obtaining melt viscosity stability while simultaneously increasing notched Izod.

Referring now to FIG. 6, improvement in notched Izod impact strength was determined for Examples E2, E3, E5, E6 and E16. The improvement in notched Izod impact strength over that of the same POM composition lacking CLA polymers—i.e. C1—was greater than 10% for E2, E5 and E6. Specifically, the improvement in notched Izod for E2 was 23.8%: for E5, 18.5%; and for E6, 23.5%.

E3 and E16 did not support the recited process of obtaining melt viscosity stability while simultaneously increasing notched Izod. E3 exhibited a decline of −19.2% notched Izod impact strength over that of C; E16 exhibited an improvement in notched Izod over its relevant comparative example, C4, of 3.0%. Therefore, E3 and E16 did not exhibit the recited increase in notched Izod.

Of note for E16, it comprised POM-D, a polyoxymethylene of very low molecular weight, i.e., having a high melt-mass flow rate, and a six-arm CLA polymer having a total molecular arm weight of 15 000, each arm having molecular weight of 2500. Even though POMs of low molecular weight, such as POM-D, are typically not used when high impact strength is required, the notched Izod impact strength of E16 nonetheless increased slightly compared to C4, containing only POM-D and no CLA polymer. Although not supporting the recited process of obtaining melt viscosity stability and simultaneously increasing notched Izod, E16 does exhibit that adding CLA polymers described herein improves even the notched IZOD of low molecular weight POMs.

For compositions containing linear polyethylene oxide [PEG] polymers—L1 through L7, FIG. 4 shows that their S values were small, typically positive, and comparable to the S values of compositions E1, E2, E4 through E6 and E9 through E12. FIG. 6 shows that improvement in notched Izod impact strength was determined only for L2, L4 and L7. Improvement in notched Izod impact strength for L4 was 7.3% and for L7 was zero over that of a polyoxymethylene lacking CLA polymers.

Although the L2 composition exhibited an S value between −0.005 and +0.005 and an increase in notched Izod impact strength of 17.2% over of a polyoxymethylene lacking CLA polymers and linear PEG polymers, L2 did NOT anticipate or obviate the recited process of obtaining melt viscosity stability and simultaneously improving notched Izod because it does not contain the recited CLA polymer.

For compositions containing the Boltorn® B-H40 polymer, the S value for composition B6 was notable for its large negative value. To test whether this melt viscosity instability was due to impurities in B-H40, B-H40 was purified and formulated into composition B3 and B4. However in at least B4 the melt viscosity instability persisted as shown by the large negative S value of B4. The inventors posit that the melt instability was due to residual toluenesulfonic acid (TsOH) used to catalyze the condensation polymerization of dimethylolpropionic acid. Some of the TsOH is free and therefore easily removed by filtering through neutral alumina, but some is covalently attached through sulfonate esters to the B-H40 polymer. These esters cleave at the elevated melt temperature of the POM composition, releasing TsOH or the corresponding sulfinic acid, and thus destabilize the melt viscosity of the POM composition.

In summary, FIGS. 4 and 6 show in concert that E2, E5, and E6 support the process of obtaining a stable melt viscosity and a simultaneous and surprising increase in notched Izod impact strength. To be clear, E2, E5, and E6 provide a wide range of support for the recited process. The CLA polymer in E2 was a 4 arm polymer, having a total arm molecular weight of 10 000, each arm having a molecular weight of 2500. The CLA polymer in E5 was an eight arm polymer, having a total arm molecular weight of 10 000, each arm having a molecular weight of 1250. The CLA polymer in E6 was an eight arm polymer, having a total arm molecular weight of 40 000, each arm having a molecular weight of 5000.

FIG. 5

FIG. 5 supports the recited process of: decreasing relative apparent capillary melt viscosity by at least 40% when compared to that of a relevant POM lacking a CLA polymer described herein. FIG. 5 (A and B) depicts the percent change in the relative apparent capillary melt viscosity of the examples and other compositions. The data underlying FIG. 5 are in Tables 2a to f in identified as Relative Apparent Capillary Melt Viscosity and Relative Apparent Capillary Melt Viscosity Improvement as % Decreased.

The percent change in the relative apparent capillary melt viscosity is determined by: calculating the relative apparent capillary melt viscosity; and then subtracting that value from 100%. The values for relative apparent capillary melt viscosity in Tables 2 a though f were determined by the following:

$$\text{Relative Apparent Melt Capillary Viscosity} = \frac{\text{the Apparent Capillary Melt Viscosity } [ACMV] \text{ of the Composition of Interest at 55 sec}^{-1}}{\text{the } ACMV \text{ of the Relevant Comparative Example at 55 sec}^{-1}}$$

As Tables 2a through f show, the relative ACMV for each of the comparative examples, C1, C2, C3, and C4, were set to 1.000. C1 is POM-B; C2 is POM-GC; C3 is POM-C; and C4 is POM-D.

In essence, the relative ACMV is the apparent melt capillary viscosity normalized against that of the relevant POM without CLA polymers. Referring now to Table 2a to clarify how relative ACMV is calculated, Table 2a shows that the values for the relative ACMV at 55 $sec^{-1}$ of compositions E1 through E6—respectively, 0.969, 0.354, 0.294, 0.936, 0.319, and 0.549—and were obtained by:

dividing the ACMV of E1 through E6-2128, 777, 646, 2054, 701, and 1204—by 2196, the ACMV of C1, a POM-B composition. The values for relative ACMV at 55 $sec^{-1}$ for all other compositions listed in Tables 2b through f were obtained in the same way as just described.

Thus, Tables 2b and c show that the ACMV values of B1, B2, B5, L1 through L7, which comprise POM-B, were normalized against the ACMV value of C1 (POM-B) to obtain relative apparent capillary melt viscosities. Table 2b also shows that the ACMV values of B3, B4, B6, and B7, which comprise POM-GC—a lower molecular weight polyoxymethylene than POM-B—were normalized against C2 (POM-GC). The values of relative ACMV in Tables 2d through 2f were calculated similarly, that is, by normalizing the ACMV against that of the relevant comparative example.

Referring now to 5A, each of E1 through E6 contained POM-B and 2 weight percent of its individual CLA polymer. E2, E3, E5, and E6 supported the recited improvement of relative apparent capillary melt viscosity of at least 40% compared with that of the relevant Comparative Example C1 (POM-B with no CLA polymer) The specific improvements were the following: E2, 65% when compared to that of the relevant control; E3, 71%; and E5, 45%. These improvements were surprising and unexpected.

In FIG. 5A, E1 and E4 did not exhibit the recited improvement of relative apparent capillary melt viscosity and do not support the recited process. The average molecular weight of each arm of E1 (4 arms) was 500, while the average molecular weight of each arm of E4 (8 arms) was 250. These results may indicate that CLA polymers having an individual arm molecular weight below about 500 may not be as effective in decreasing the relative apparent capillary melt viscosity of POM compositions. Of course, such an observation must be tempered by the fact that the specific CLA polymers of E1 and E4 may perform differently when used with a POM of higher or lower molecular weight than POM-B.

Referring now to FIG. 5B, each of E7 through E16 exhibited at least some improvement in relative apparent capillary melt viscosity upon the addition of the relevant CLA polymer. In particular, E7 through E14 and E16, but not E15, supported the recited process as each of these examples exhibited an improvement in relative apparent capillary melt viscosity of greater than 40% when compared to that of the relevant comparative example. E7 to E14 contained POM-B; E15 contained POM-C, a very high molecular weight POM; and E16 contained POM-D, a very low molecular weight POM.

In addition, the supporting examples show the effect of varying the amount of added CLA polymer on the improvement of relative apparent capillary melt viscosity. E7 through E9 and E12 exemplify POM compositions described herein having 2.0 weight percent of the CLA polymer; E10 has 0.5 weight percent CLA polymer; E11 has 1.0 weight percent CLA polymer; E13 has 5.0 weight percent CLA polymer; E14 has 10.0 weight percent CLA polymer. FIG. 5B shows generally that increasing the concentration of CLA polymer in the POM compositions described herein relates to greater improvement in relative apparent capillary melt viscosity.

E14, however, may portend a limit on the effective amount of CLA polymer inasmuch as E14 has a 10.0 weight percent of CLA and exhibits high improvement in relative apparent capillary melt viscosity but an S value of −0.0089, greater than the recited range of +0.005 to −0.005, which is outside the recited range defined as melt-viscosity stable. E14 implies that POM compositions with higher concentrations of CLA polymers—at or above 10.0 weight percent—may exhibit improved relative apparent capillary melt viscosity at the expense of relinquishing melt-viscosity stability. E14 may therefore indicate a preferred concentration of CLA polymer in the POM compositions described herein of between 2.0 weight percent and 5.0 weight percent achieve both the recited melt-viscosity stability and the recited improvement in relative apparent capillary melt viscosity.

Although E15 did not support the recited improvement in relative apparent capillary melt viscosity of at least 40%, it did achieve a 38% improvement. Two factors may have some bearing: POM-C is a very high molecular weight POM; and the molecular weight of each arm in the CLA polymer is about 1667, which is lower than 2000, a possibly preferred minimum arm molecular weight. Nonetheless, the 38% improvement of E15 in relative apparent capillary melt viscosity was still greater than the improvement of any L composition, as FIG. 5A shows.

FIG. 5 in general shows that the examples that support the recited improvement of 40% relative apparent capillary melt viscosity—E2, E3, E5 through E14 and E16—were variable as to polyoxymethylenes used, number of arms of the CLA polymers, and molecular weight of the arms. In particular, the POMs of supporting examples included POM-B and POM-D; moreover, E15 showed almost the recited improvement using POM-C, a very high molecular weight POM. Moreover, the CLA polymers in E2 had four arms; in E3, E7, E8, E10 through E14, and E16 had six arms; and in E5, E6 and E9 had 8 arms. The CLA polymers in the supporting examples had individual arm molecular weights that ranged from 1667 to 5000. Thus, the supporting examples in FIG. 5 confirm that the recited process of obtaining the recited improvement of 40% in relative apparent capillary melt viscosity using POM compositions described herein has broad scope.

Referring again now to FIG. 5A, "B" samples (B1 through B7), which contained the B-H40 or B-H40fp polymer additive ("the B-additive"), showed erratic results. "B" samples containing 0.5 weight percent of the B-additive—B1 (POM-B+B-H40fp), B3 (POM-B+B-H40), and B6—exhibited less than the recited at least 40% improvement in relative apparent capillary melt viscosity. In fact, B6 showed at least a 40% increase in relative apparent melt viscosity over that of the relevant comparative example. "B" samples containing 2.0 weight percent of the B-additive—B2 (POM-B+B-H40fp), B5 (POM-B+B-H40, and B7 (POM-GC+B-H40) exhibited at least 40% improvement in the relative apparent capillary melt viscosity. Thus, 0.5 weight percent of the B-additive is insufficient to facilitate the recited improvement in POM compositions.

As for the linear polyethylene glycols L1 through L7, which as a group include a variety of molecular weights, FIG. 5A shows that none of these achieved the recited improvement.

FIG. 7

Figure 7:
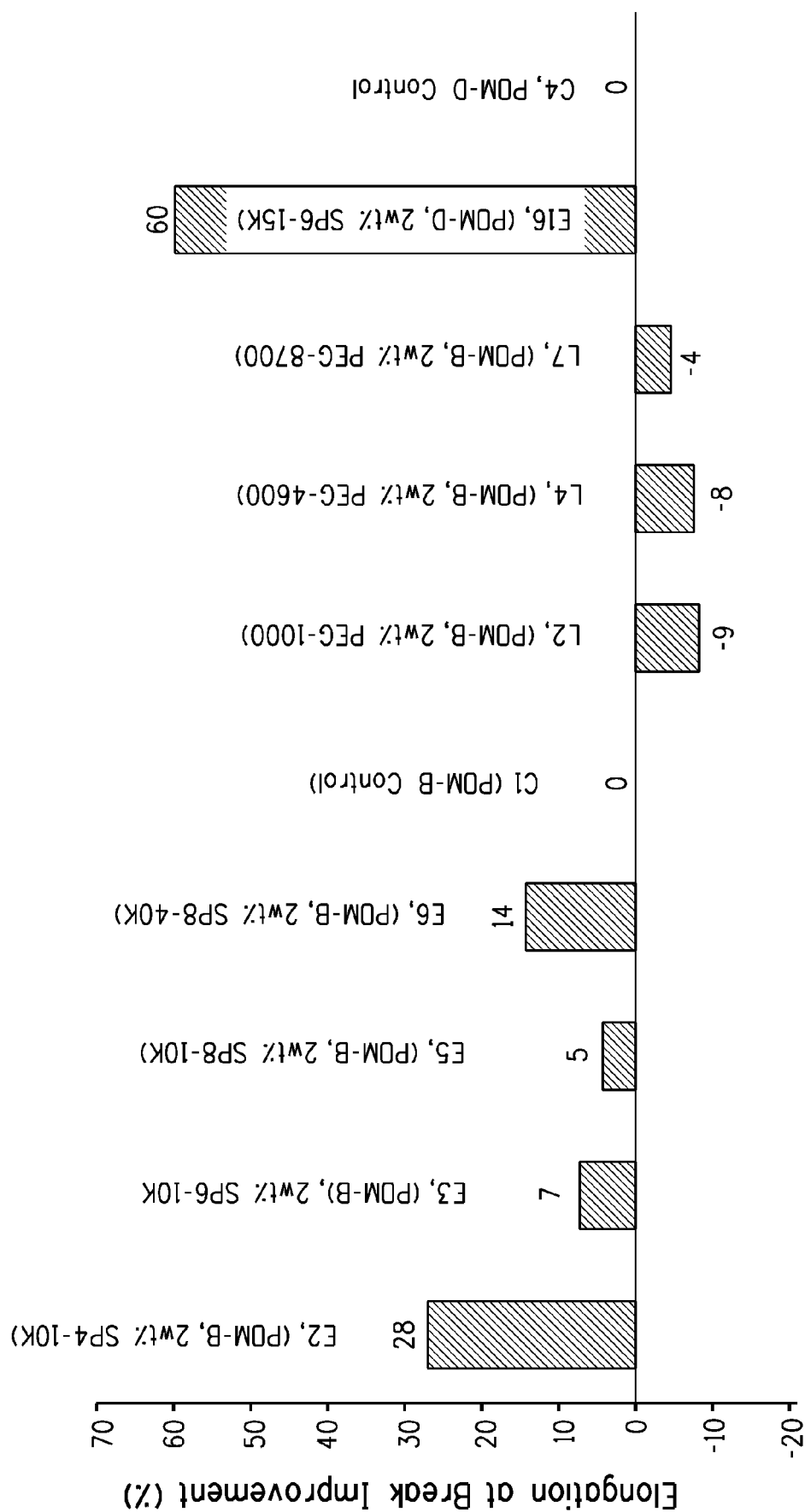
FIG. 7 illustrates elongation at break values of exemplary compositions.

FIG. 7 shows the improvement of elongation at break as a percent of the tensile elongation to break of the relevant comparative example, either C1 or C4 (POM-B or POM-D, respectively, without CLA polymer). The test was carried out by the methods of ASTM D-638 at a testing speed of 50 mm/min.

Referring now to FIG. 7, elongation at break was calculated for the following: E2, E3, E5, E6, C1, L2, L4, L7, E16, and C4. E2, E3, E5, and E6 support the recited at least 4% improvement of elongation at break. In particular, E2 exhibited almost a 28% increase; E3, about a 7% increase; E5 about a 5% increase; and E6, about a 13% increase.

None of the tested linear polyethylene glycols—L2, L4, and L7—exhibited increases in elongation at break. Molding tensile bar samples of POM compositions the Boltorn® polymer additives to determine their elongation at break was impossible because of the instability of these compositions.

What is claimed is:

1. A process comprising:
   molding a polyoxymethylene composition,
       the polyoxymethylene composition comprising:
       (a) from 50 to 99.5 weight percent of at least one polyoxymethylene polymer selected from the group consisting of homopolymer, copolymer and mixtures of these;
       (b) from 0.5 to 10 weight percent of at least one polymer;
       (c) from 0 to 30 weight percent of one or more fillers; and
       (d) from 0 to 10 weight percent of additives,
       wherein: the total weight percent of (a), (b), (c), and (d) is 100 percent,
       wherein the at least one polymer of (b) is selected from the group consisting of:
       (I) one or more polymers having a core-link-arm structure such that:
           the core comprises one or more carbon atoms, none of which is a carbonate carbon, and is attached to at least three arms comprising diradical repeat units;
       (II) one or more polymers having a core-link-arm structure such that:
           each arm comprises a diradical repeating unit,
           the core has a molecular weight of greater than 45, does not comprise the repeating unit of the arm, and is attached to more than two arms; and
           the mass ratio of arms to core in the core-link-arm structure is greater than 3; and
       (III) one or more polyols having a core-link-arm structure such that:
           the core has a molecular weight from 118 to 1000;
           each link is selected from the group consisting of a bond, .O., .CH$_2$O., and any combination of these; and
       (IV) any combination of (I), (II), and (III), and
       wherein number average molecular weight of each arm in the core-link-arm structure of the at least one polymer b) ranges from 500 to 10,000; and
   wherein the molded polyoxymethylene composition exhibits at least one of the properties selected from the group consisting of:
   (A) a melt viscosity stability, as measured by ASTM D3835 at 220° C. and 100 s$^{-1}$ shear rate, of greater than −0.005 and a simultaneous increase in notched Izod impact strength, as measured by ASTM D 256-06a, of at least 10 percent when compared to the notched Izod impact strength of a composition consisting of the same polyoxymethylene polymer and the same additives and fillers, measured under the same conditions;
   (B) a decrease in relative apparent capillary melt viscosity, as measured by ASTM D-3835 at 220° C. and shear rate 55 sec$^{-1}$, of at least 40 percent when compared to the relative apparent capillary melt viscosity of a composition consisting of the same polyoxymethylene polymer and the same additives and fillers, measured under the same conditions;
   (C) an increase in flow length, as tested under Flow Length Test Conditions, of at least 5 percent when compared to the flow length of a composition consisting of the same polyoxymethylene polymer and the same additives and fillers, measured under the same conditions; and
   (D) when molded into a Type I specimen, an increase in elongation at break, as measured according to ASTM D638-08 at a speed of testing of 50 mm per minute, of at least 4 percent when compared to the elongation at break of a composition consisting of the same polyoxymethylene polymer and the same additives and fillers, measured under the same conditions.

2. The process of claim 1, wherein the polyoxymethylene composition exhibits a melt viscosity stability of greater than −0.002.

3. The process of claim 1, wherein the increase in flow length is at least 10 percent when compared to the flow length of a composition consisting of the same polyoxymethylene polymer and the same additives and fillers, measured under the same conditions.

4. The process of claim 1, wherein the polyoxymethylene polymer comprises copolymer.

5. The process of claim 1, wherein the polyoxymethylene polymer comprises homopolymer.

6. The process of claim 1, wherein the polyoxymethylene composition has a polymer melt mass flow rate that ranges from 0.1 to 50 grams/10 minutes, as measured by ASTM D1238-04c at Condition 190/2.16.

7. The process claim 1, wherein the core of the at least one polymer (b) comprises from 4 to 40 carbon atoms.

8. The process of claim 1, wherein the core of the at least one polymer (b) of (I) or (II) has a molecular weight from 118 to 1000.

9. The process of claim 1, wherein the core of the at least one polymer (b) comprises one or more units selected from the group consisting of: .CH$_2$C(CH$_2$O.)$_3$, .CH$_2$C(CH$_2$CH$_3$)(CH$_2$O.)$_2$, .OCH$_2$CH(O.)CH$_2$., .CH(O.)CH(O.)., and .CH(O.)CH(O.)CH(O.)..

10. The process of claim 1, wherein the core of the at least one polymer (b) is free of one or more units selected from the group consisting of: .OC(=O)O., .C(=O)O., .CH$_2$CH$_2$O., .CH$_2$CH$_2$OCH$_2$CH$_2$O., and .CH$_2$OCH$_2$OCH$_2$O..

11. The process of claim 1, wherein the links of the at least one polymer (b) of (I) or (II) are selected from the group consisting of a bond, .O., .CH$_2$O., and any combination of these.

12. The process of claim 11, wherein the link is .O..

13. The process of claim 1, wherein at least one arm attached to the core of the at least one polymer (b) has a terminal group selected from .H, .OH, .R, .C(=O)OR, .C(=O)NR$_2$, .C(=O)NHR, .C(=O)NH$_2$, .OC(=O)R, .C(=O)R, .OR, and .X,
    wherein R comprises an optionally substituted alkyl, cyclic, cycloalkyl, or aromatic group of one to twelve carbons, and
    X is selected from the group consisting of fluorine, chlorine, bromine, iodine, and any combination of these.

14. The process of claim 1, wherein the number of arms of the at least one polymer (b) ranges from four to twenty-four.

15. The process claim 14, wherein the number of arms of the at least one polymer (b) ranges from four to 8.

16. The process of claim 1, wherein number average molecular weight of each arm attached to the core of the at least one polymer (b) ranges from 800 to 6000.

17. The process of claim 16, wherein number average molecular weight of each arm attached to the core of the at least one polymer (b) ranges from 1800 to 5000.

18. The process of claim 1, wherein each arm attached to the core of the at least one polymer (b) is a polyether, and preferably polyethylene oxide.

19. The process of claim 18, wherein the core-link-arm structure of the at least one polymer (b) was made by covalently attaching a core to arms, or by growing arms out of a core, or by forming a core from arms, or by any combination of these.

20. The process of claim 18, wherein the link is .O..

* * * * *